US010419965B1

(12) United States Patent
Kadosh et al.

(10) Patent No.: US 10,419,965 B1
(45) Date of Patent: Sep. 17, 2019

(54) DISTRIBUTED METERS AND STATISTICAL METERS

(71) Applicant: Cisco Technology, Inc., San Jose, CA (US)

(72) Inventors: Aviran Kadosh, Moreshet (IL); Ofer Iny, Tel Aviv (IL); Eyal Michel Dagan, Zichron Yaakov (IL)

(73) Assignee: Cisco Technology, Inc., San Jose, CA (US)

( * ) Notice: Subject to any disclaimer, the term of this patent is extended or adjusted under 35 U.S.C. 154(b) by 203 days.

(21) Appl. No.: 15/397,766

(22) Filed: Jan. 4, 2017

Related U.S. Application Data

(60) Provisional application No. 62/275,296, filed on Jan. 6, 2016.

(51) Int. Cl.
| | | |
|---|---|---|
| H04W 28/02 | (2009.01) | |
| H04L 12/26 | (2006.01) | |
| H04L 1/00 | (2006.01) | |
| H04L 29/12 | (2006.01) | |
| H04W 72/04 | (2009.01) | |

(52) U.S. Cl.
CPC ....... *H04W 28/0263* (2013.01); *H04L 1/0018* (2013.01); *H04L 43/16* (2013.01); *H04L 61/2592* (2013.01); *H04W 72/0453* (2013.01)

(58) Field of Classification Search
CPC ......... H04W 28/0263; H04W 28/0284; H04W 28/16; H04W 28/20; H04W 28/26; H04W 72/0453; H04L 1/0018; H04L 43/16; H04L 61/2592
See application file for complete search history.

(56) References Cited

U.S. PATENT DOCUMENTS

2003/0088690 A1* 5/2003 Zuckerman ............ H04L 47/10
709/232
2003/0187934 A1* 10/2003 Nishikawa .......... H04L 12/5602
709/206

(Continued)

OTHER PUBLICATIONS

Nichols et al., "A two-bit differentiated services architecture for the internet", Dec. 1997, tools.ietf.org, RFC 2638, pp. 1-30 (Year: 1997).*

(Continued)

*Primary Examiner* — Un C Cho
*Assistant Examiner* — Shah M Rahman

(57) ABSTRACT

In one embodiment, a network node comprising: a memory, including one or more memory entries associated with a meter; a sensor adapted to detect a discrepancy between an allocated bandwidth allocated to the meter and a data bandwidth measured by the meter, the allocated bandwidth being a portion of a total allocated bandwidth allocated to a plurality of meters, and the discrepancy being that the allocated bandwidth compared to the data bandwidth is one of: excessive or insufficient; and a generator, wherein the generator is adapted, upon the sensor detecting that the allocated bandwidth is excessive, to generate a message indicative of at least part of the allocated bandwidth being released from the meter, and wherein the generator is further adapted, upon the sensor detecting that the allocated bandwidth is insufficient, to generate a message indicative of a request for an allocation of additional bandwidth to the meter.

23 Claims, 12 Drawing Sheets

(56) References Cited

U.S. PATENT DOCUMENTS

| | | | | |
|---|---|---|---|---|
| 2004/0117476 | A1* | 6/2004 | Steele | G06F 9/5083 709/224 |
| 2006/0062209 | A1* | 3/2006 | Riley | H04L 43/10 370/352 |
| 2008/0298303 | A1* | 12/2008 | Tsirtsis | H04W 76/15 370/328 |
| 2009/0122698 | A1* | 5/2009 | Lakshmikantha | H04L 47/10 370/229 |
| 2011/0173637 | A1* | 7/2011 | Brandwine | G06F 9/5072 719/314 |
| 2012/0026877 | A1* | 2/2012 | Rajappan | H04L 47/724 370/235 |
| 2012/0108245 | A1* | 5/2012 | Zhang | H04W 28/08 455/443 |
| 2012/0327779 | A1* | 12/2012 | Gell | H04L 47/2475 370/238 |
| 2016/0050653 | A1* | 2/2016 | Rastogi | H04W 72/0406 455/453 |

OTHER PUBLICATIONS

R. Braden et al., "Resource ReSerVation Protocol (RSVP)—Version 1 Functional Specification", Sep. 1997, tools.ietf.org, RFC 2205, pp. 1-112 (Year: 1997).*

Y. Bernet et al., "Framework for Use of RSVP with Diff-serv Networks", Nov. 1998, tools.ietf.org, draft-ietf-diffserv-rsvp-01.txt, pp. 1-20 (Year: 1998).*

Blake, S. et al.; An Architecture for Differentiated Services (1998), RFC 2475.

Heinanen, J. et al.; A Single Rate Three Color Marker (1999), RFC 2697.

* cited by examiner

DISTRIBUTED METERS AND STATISTICAL METERS

CROSS-REFERENCE TO RELATED APPLICATIONS

This application claims the benefit of priority from U.S. Provisional Patent Application, Ser. No. 62/275,296, filed on Jan. 6, 2016, which is hereby incorporated by reference herein.

TECHNICAL FIELD

Embodiments described herein generally relate to meters for data traffic.

BACKGROUND

A meter at a network node may be associated with a traffic profile rate. The meter may measure a rate of data traffic classified to the meter. The processing of packets of the data may, depend, at least partly, on whether or not the rate of the data traffic exceeds the traffic profile rate.

BRIEF DESCRIPTION OF THE DRAWINGS

For clarity of illustration, components shown in the figures have not necessarily been drawn to scale. For example, the dimensions of some of the components may be exaggerated relative to other components for clarity of presentation. Furthermore, reference numerals may be repeated among the figures to indicate corresponding or analogous components. The figures are listed below.

DESCRIPTION OF EXAMPLE EMBODIMENTS

Overview

Figure 1:
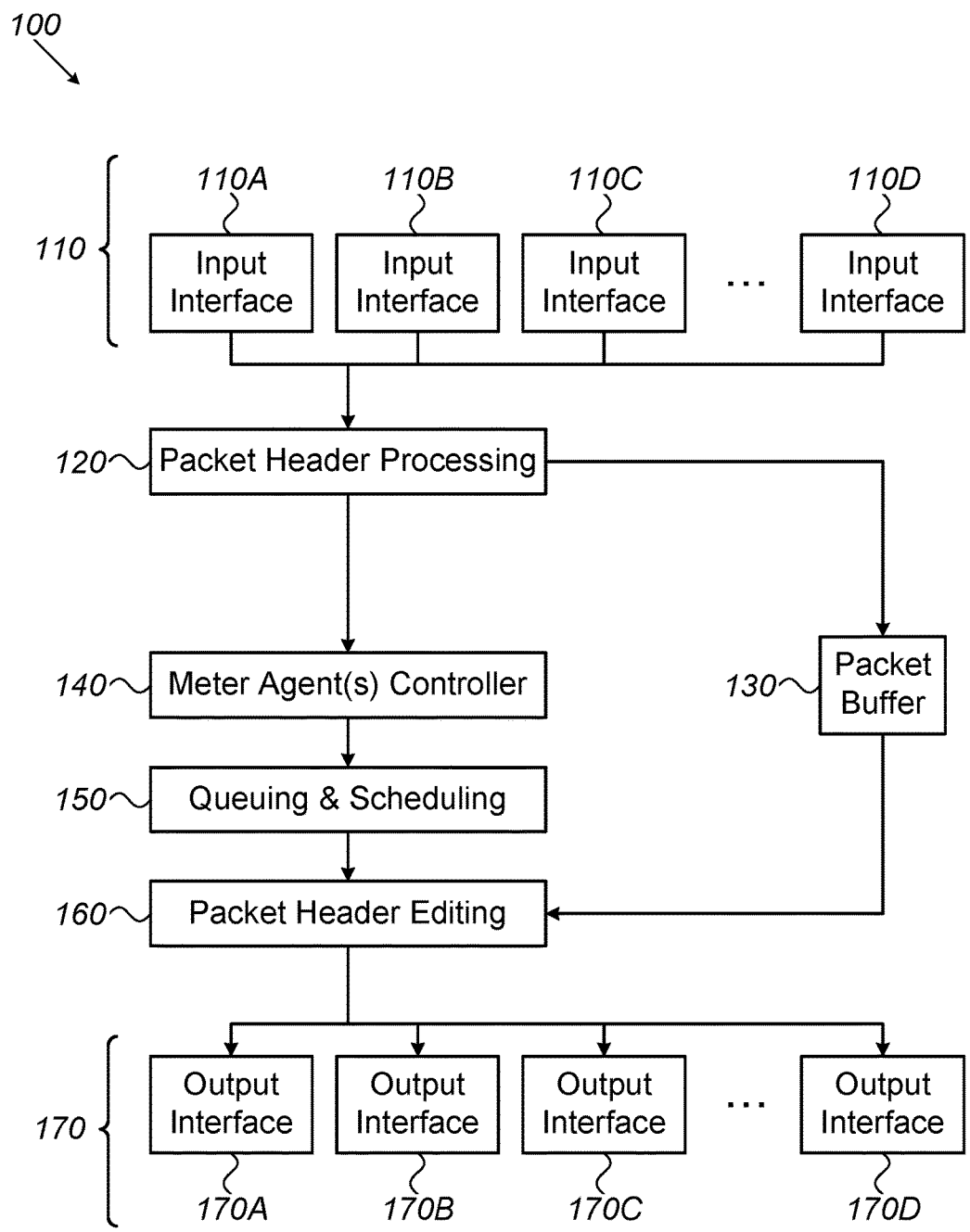
FIG. 1 is a block diagram of a switch that includes one or more statistical meters, in accordance with some embodiments of the presently disclosed subject matter.

There is provided, in accordance with some embodiments of the presently disclosed subject matter a network node in a packet communication network, the network node comprising: a memory, including one or more memory entries associated with a meter; a sensor adapted to detect a discrepancy between an allocated bandwidth allocated to the meter and a data bandwidth measured by the meter, the allocated bandwidth being a portion of a total allocated bandwidth allocated to a plurality of meters, and the discrepancy being that the allocated bandwidth compared to the data bandwidth is one of: excessive or insufficient, in accordance with at least one criterion; and a generator, wherein the generator is adapted, upon the sensor detecting the discrepancy of the allocated bandwidth being excessive, to generate a message indicative of at least part of the allocated bandwidth being released from the meter, thereby enabling the at least part of the allocated bandwidth, or a portion thereof, to be reallocated to one or more of the plurality of meters, and wherein the generator is further adapted, upon the sensor detecting the discrepancy of the allocated bandwidth being insufficient, to generate a message indicative of a request for an allocation of additional bandwidth to the meter, and upon the sensor detecting the discrepancy of the allocated bandwidth being excessive, the at least part of the allocated bandwidth is released from the meter.

There is further provided, in accordance with some embodiments of the presently disclosed subject matter a network node in a packet communication network, the network node comprising: a parser adapted to parse at least one first message that was received, each of the at least one first message indicative of at least one of: a release of at least part of an allocated bandwidth allocated to a particular meter, the particular meter being one of a plurality of meters, or a request that additional bandwidth be allocated to the particular meter; a reallocator adapted to reallocate at least a portion of a total allocated bandwidth, allocated to the plurality of meters, to at least a subset of the plurality of meters; and a generator adapted to generate at least one second message for the at least a subset of the plurality of meters, each of the at least one second message being indicative of a respective updated allocated bandwidth for a respective meter of the at least a subset of the plurality of meters.

Example Embodiments

The following embodiments relate to distributed meters and statistical meters described below in more detail. Depending on the embodiment, a meter located at a network node may be neither statistical nor part of a distributed meter, may be statistical and part of a distributed meter, may be only statistical, or may be only be part of a distributed meter.

The traffic profile rate of a meter (referred to herein also as "allocated bandwidth") may in some cases be an arbitrary reflection of a service level agreement ("SLA") between a customer and a service provider. For example, a service level agreement may specify a global customer data rate (also referred to herein as "the committed rate") that may in some cases represent a total allocated bandwidth. More generally, there may be a total allocated bandwidth relevant to various flows in a network which may or may not all relate to a single measured entity. The network may lack a network node where a meter may be located to measure the rate of all such relevant data flows. For example, there may not be any node for locating a meter, where the meter may measure the data rate (referred to herein as "data bandwidth" or "traffic rate") of all of the traffic of a measured entity. Rather in such a network, the relevant traffic flows may travel along a plurality of paths, not all of which may have a common node, and thus relevant traffic flows may need to be measured by meters located at a plurality of nodes. In some cases, the allocated bandwidth to each meter, out of a plurality of meters, may be a fixed percentage of the total allocated bandwidth (e.g. global customer data rate) to the plurality of meters. However, in accordance with some embodiments of the presently disclosed subject matter, the respective portions of the total allocated bandwidth that are allocated to each meter may instead vary based, at least partly, on discrepancies between bandwidths allocated to the meters and bandwidths measured by the plurality of meters. A distributed meter may be defined that comprises such a plurality of meters, the plurality of meters sharing a total allocated bandwidth in any appropriate manner that takes into account discrepancies between allocated bandwidths and data bandwidths measured by the plurality of meters. For example, the detection of discrepancies may lead to the generation of messages for releasing, requesting and/or granting bandwidth. The distributed meter may thus be advantageous over an implementation where the allocated bandwidth of a meter is a fixed percentage of the total allocated bandwidth (e.g. global customer rate), e.g. derived by dividing the total allocated bandwidth into fixed shares for the various meters. As will be explained further below, in some embodiments, two or more distributed meters in a network may also share bandwidth with one another, meaning that the total allocated bandwidth to a particular distributed meter may vary in such embodiments and may not necessarily be fixed, potentially reaching the total bandwidth allowed for the network. It is also noted, that in some embodiments, as will be described in more detail below, sharing of a total allocated bandwidth may additionally or alternatively occur among meters that are at the same network node.

Referring now to statistical meters, at a node of a network, there may be a one or more meters sharing memory. The rate of accessing memory ("access rate"), for operation of the meter(s), may be constrained due to the type of memory as will be explained in more detail below. A meter where the memory is not necessarily updated per packet is referred to herein as a statistical meter. Implementation of a statistical meter may overcome the memory access rate constraint while still allowing data bandwidth to be measured by the meter. Such an implementation may be advantageous over an implementation where in order to reduce the number of accesses to a given memory, a particular meter that would have corresponded to a particular flow or flows may be replaced by two or more meters, not all of which may be in the given memory. The two or more meters may correspond to sub-flows of the particular flow or flows, and each of the various packets in the particular flow(s) that would have been classified to the particular meter, may be included in a certain sub-flow and therefore classified to the meter corresponding to the certain sub-flow. The allocated bandwidths for the two or more meters may in some cases be an arbitrary reflection of what would have been the allocated bandwidth for the particular meter that would have corresponded to the particular flow or flows. For example, the allocated bandwidths in the latter implementation may be fixed percentages of what would have been the allocated bandwidth for the particular meter that would have corresponded to the particular flow or flows, e.g. derived by dividing the allocated bandwidth into fixed percentages for the two or more meters.

Reference to a network herein may refer to any packet communication network, which may vary depending on the embodiment. Examples of a packet communication network may include the Internet, a datacenter network, an enterprise network, a local area network, a wide area network etc. Typically although not necessarily a network may be an internet protocol (IP) network. The term network will be referred to herein in the single form, even though in some cases a network may comprise a plurality of networks. Traffic in a network may include network packets (or simply "packets") that may be transferred over the network using any appropriate wired and/or wireless technology. The number of bytes per packet may not necessarily be constant. For example, in some embodiments, a packet may comprise anywhere between 64 bytes and 9 kilobytes, or any other appropriate number of bytes. The terms "rate" and "bandwidth" are sometimes used interchangeably herein. The term "traffic" as used herein refers to data traffic. The terms "network node" and "node" should be broadly construed as any node in a network, such a connection point, a redistribution point, a communication endpoint, etc. For example, an endpoint may be a node that has an IP address. Examples of a network node may include: a firewall, server, storage machine, load balancer, network interface card/controller, wireless network interface card/controller, repeater, modem, bridge, hub, switch (regular or multilayer), router, bridge-router, gateway, protocol converter, network address translator, multiplexer, integrated services digital network, terminal adaptor, line driver, etc. Although in the description below, a switch is sometimes used as an example of network node where a meter may be located, embodiments are not limited to a switch, and in other embodiments the meter may be located at a different type of network node.

Before discussing statistical meters and distributed meters in more detail, a possible implementation of a meter at a network node is now described. In such an implementation, the meter may include one or more memory entries with one or more counters, also referred to herein as bucket(s). The value of a counter may be increased and/or may be decreased. The meter may also include component(s) to increase the value, in accordance with a fill rate dependent on the allocated bandwidth, and to decrease the value for packets as will be described in more detail below. A bucket may be modeled as a token bucket or as a leaky bucket. In a meter comprising a token bucket, tokens may be added (also referred to herein as "deposited") to the bucket in accordance with a token rate of the meter, each token representing a certain quantity of data units (e.g. bits). The value of the bucket may thereby be increased by tokens of data units in accordance with the token rate. Traditionally, each token that is added represents a constant number of bits, the number of bits being constant not only for a particular meter but for all meters at a given node (e.g. in a certain switch). For example, the constant number may be internally configured. The product of the token size in bits (or in any other data units) and the token rate (e.g. in bits per second) is the fill rate. Tokens may be added to the bucket as long as the value of the bucket (or in other words the bucket size) is below the maximum bucket size. The maximum bucket size may define the maximum burst allowed for flow(s) measured by the meter. Having a maximum may therefore reduce the possibility of a burst flooding the network. An incoming packet that is classified (or in other words "mapped") to the meter may consume data units (e.g. bytes) from the bucket in accordance with the size of the packet, and therefore the value of the bucket may be accordingly decreased. Such a packet may be considered to be a conforming packet with a low drop precedence. However, if a packet that is classified to the meter encounters a zero size bucket or a bucket having a size lower than the packet size, the packet may be considered to be non-conforming, and consequently the packet may be marked with a high drop precedence. Typically although not necessarily, the value of the bucket may not be reduced for a packet marked with a high drop precedence. A particular drop precedence of a packet may signify the precedence of a packet with regard to dropping. Depending on the embodiment, a packet that is marked with a high drop precedence may be dropped by the node or may be more likely to be dropped at the next node the packet passes through than if the packet were not marked with high drop precedence, etc.

In some embodiments, a meter may comprise two token buckets (assumed to be at the same memory entry, but possibly not). The value(s) of the bucket(s) may be increased by tokens of data units in accordance with the token rate of the meter. Additionally or alternatively, the decision on whether a packet conforms (or in other words has low drop precedence), or is marked with a high drop precedence may be dependent not only on the amount of bytes in the bucket(s) but also on the whether the packet was or was not previously marked with a high drop precedence. For example, tokens may be added into a first one of the buckets. When the first bucket is full, the excess may spill into a second bucket of the buckets (as long as the second bucket is not already full), e.g. in order to accommodate traffic bursts. When an incoming packet, regardless of the previous drop precedence, encounters a first bucket that includes more bytes than, or at least the same number of bytes as, the size of the packet, the packet may be considered to be conforming, and the value of the first bucket (or the value(s) of the first and/or second buckets) may be reduced by the size of the packet. Regardless of the previous drop precedence of the incoming packet, if the first bucket does not include enough bytes to accommodate the size of the packet, but the second bucket does, then the packet may be marked with an intermediate drop precedence, and the value of the second bucket may be reduced by the size of the packet. In any other case, the incoming packet may be marked with a high drop precedence, and the value of neither bucket may be reduced. It is assumed herein that if there is/are intermediate drop precedence packet(s), a packet so marked may be processed as low drop precedence or high drop precedence, depending on the embodiment. It is noted that the term "process" is used herein in the usual sense of handle or similar, and does not necessarily imply a processor performing the processing.

The terms "size of a packet" "packet size", "data unit(s) of a packet", and the like, as used herein refers to a number of data unit(s) that may not necessarily be equal to the actual number of data unit(s) in the packet. The packet size may equal the actual number of data unit(s) in the packet or may be any appropriate function of the actual number of data unit(s) in the packet. For example, the packet size may equal the actual number of data unit minus "A" and/or plus "B" where A and B may be configurable. A, for example may represent the Ethernet Header Size; and B, for example may represent the Virtual Extensible LAN "VxLAN" Header Size.

By increasing the value(s) of the token bucket(s) by the fill rate and/or reducing the value(s) of the token bucket(s) for packets, the meter may measure the data bandwidth against the bandwidth allocated to the meter. Therefore in such an implementation of a meter, the meter measures the data bandwidth by measuring the data bandwidth against the allocated bandwidth. It is noted that the implementation of the token bucket(s) results in restricted measurement accuracy due to there being a maximum value (e.g. maximum bucket size) which sets a limit on the accumulated surplus of past allocated bandwidth over past data bandwidth, and due to there being a minimum value (e.g. zero). It may be understood that the implementation of a meter may vary depending on the embodiment and may not be necessarily restricted to token bucket(s) or leaky token bucket(s) discussed above, as long as the meter may measure the data bandwidth. In various embodiments, a packet classified to a meter may be processed based on the state of the meter (e.g. based on whether or not the data bandwidth was measured as being amply lower than the allocated bandwidth for there to be enough allocated bandwidth available to accommodate the packet) and/or based on a previous drop precedence of the packet. For example, a current drop precedence of a packet may be marked (e.g. in a differentiated services field in the header), depending on the state of the meter and/or on a previous drop precedence of the packet. A packet is referred to herein as being marked with a drop precedence (e.g. with high drop or intermediate drop precedence), regardless of whether the drop precedence is being changed or retained from before. Additionally or alternatively, for example, the meter may or may not be updated for the packet, depending on the state of the meter and/or on a previous drop precedence of the packet.

Although an implementation of a meter was described above with reference to single meter at a node, depending on the embodiment a node may include one meter or may include a plurality of meters. For example, in some cases where the node may include a plurality of meters, each meter may be adapted to measure data bandwidth for one or more different flows that passes through the node. For example, whether or not a meter measures data bandwidth for one flow or more than one flow that passes through the node may depend on the definition of the flow.

The definition of a flow may vary depending on the embodiment. In some embodiments, for example, in case of TCP/IP or UDP/IP, a finest grained classification to flow is the socket (native socket), which is identified by the 5-tuple of: Destination-IP-Address; Source-IP-Address; Source-Port; Destination-Port; and Protocol (when tunneling is employed, the IP header of the tunnel may be used instead of the native socket). The fields selected as the flow discriminators are referred to as the Flow Vector. In one example, the size of the flow Vector, e.g., in case of 5-tuple IPv4, is 104-bits (b). Any other vector size may be used. In some of such embodiments, at least this information may be used to directly identify the flow, e.g., as described below. In some other of these embodiments, any other additional or alternative information may be used to identify the flow.

In some embodiments, since the number of simultaneously active flows may usually be much lower than the flow vector space, it may be safe to identify the flow with a Flow Signature, which is a hash of the Flow Vector. For example, with a 32b Flow Signature, the likelihood that two active flows will map to the same signature is insignificantly low. Thus, if flow load balancing is made tolerant/indifferent of such rare collisions (even with some small loss of functionality) it may be advantageous to use the flow signature instead of the flow vector.

In some embodiments, a plurality of flows that may be identified by the 5-tuple may be classified to the same meter at a node. For example, flow(s) associated with the particular meter may include all packets passing through the node with a destination IP address and/or source IP address associated with a certain measured entity (e.g. a customer of a service provider of the network).

In some embodiments, a flow that may be classified to a particular meter may be defined differently, e.g. defined by the 5-tuple as well as additional criterion/criteria such as node input interface, etc. In this example, flows may be classified to different meters depending on 5-tuple and the node input interface.

The rate of a flow may vary depending on the embodiment, e.g. reaching up to hundreds of Gigabits per second. Regardless of the definition of flow, or the number of meter(s) per node, it may be understood that in some embodiments, the node (e.g. the switch) may not necessarily be capable of metering flows (or in other words measuring the data bandwidth of the flows), particularly when there is a plurality of flows at such high rates through the node. One of the reasons that a node may not be capable of metering flows may include a memory access rate constraint as will be described with reference to FIG. 2 below.

Referring now to the figures, FIG. 1 is a block diagram of a switch 100 that includes one or more statistical meters, in accordance with some embodiments of the presently disclosed subject matter.

Switch 100 may be a node of a network. A packet, e.g. arriving from another node, may enter any of the switch input interface(s) 110 of which four are shown, namely 110A, 110B, 110C, and 110D. Packet header processing 120 may be adapted to process the packet header. The packet processing may include classifying the packet to a meter (also referred to herein as "meter agent"), e.g. classify to a meter identifier identifying the meter. For example the packet may be classified based on the flow to which the packet belongs. The packet payload may optionally be saved to a packet buffer 130. Once the packet is classified to a meter, the packet or the packet metadata may be passed to the meter agent(s) controller 140. Meter agent(s) controller 140 may be adapted to determine whether or not the packet conforms with respect to the classified meter. If a packet is not dropped by meter agent(s) controller 140, then the packet or packet metadata may proceed to queueing and scheduling 150 so that the packet may be forwarded in turn. Before being forwarded, the packet may be read from queuing and scheduling 150 or from packet buffer 130. Packet header editing 160 may be adapted to optionally edit the header of the packet, e.g. to mark with a high drop, intermediate drop, or low drop precedence if so indicated by meter agents controller 140. The description does not differentiate between marking with a drop precedence performed by meter agent(s) controller 140 and indicating by meter agent(s) controller 140 which leads to later marking (e.g. by packet header editing 160). Both actual marking and the indicating that the packet should be marked, will be referred to herein as marking by the meter agent(s) controller 140. Similarly, as mentioned above, a packet is referred to herein as being marked with a drop precedence, regardless of whether the drop precedence is being changed or retained from before. Any of output interfaces 170, of which four are shown, namely 170A, 170B, 170C, and 170D, may be adapted to forward the packet in the network. The packet may be forwarded, for example, to another network node. Any output interface 170, when handling a packet marked with high drop precedence, may be adapted to forward the packet or drop the packet. The description does not differentiate between dropping performed by meter agent(s) controller 140 and dropping performed by output interface(s) 170 and will refer to both as dropping at the node.

A node that is not a switch may include a meter agent(s) controller 140, one or more of the other module(s) shown in FIG. 1 as appropriate, and/or any other module(s) as appropriate.

A meter agent(s) controller such as meter agent(s) controller 140 may in some embodiments include one or more meter(s). For example, there may be thousands of meters included in meter agent(s) controller 140. Possibly, the number of meters may be adjusted as needed. Possibly, at least part of the included meter(s) may be statistical meter(s). In such embodiments, due to the inclusion of the meter(s) in the meter agent(s) controller in these embodiments, meter agent(s) controller 140 may be considered to be adapted to perform tasks of the meter(s). Additionally or alternatively, meter agent(s) controller 140 may be adapted to control, or in other words manage, the performance of tasks relating to the meter(s), also referred to herein as managing or controlling the meter(s). The term "meter agent(s) controller" when referring to meter agent(s) controller 140 or any other meter agent(s) controller discussed herein is used in the sense of controlling the performance of tasks relating to the meter(s), and therefore usage of the term does not necessarily imply that the meter agent(s) controller includes a controller. Meter agent(s) controller 140 may be adapted to control the performance of tasks relating to the meter(s), by, for instance, controlling the timing for updating the value of the meter to reflect the measurement of the data bandwidth, such that a memory access rate constraint is taken into account as will be explained in more detail below. Additionally or alternatively, meter agent(s) controller 140 may be adapted to perform other tasks such as marking the packet with a drop precedence. A meter agent(s) controller may therefore include meter(s), module(s) for controlling the performance of tasks relating to the meter(s) and/or module(s) for performing other task(s), depending on the embodiment. For example, the module(s) for performing other task(s) may include module(s) for marking packets.

Figure 2:
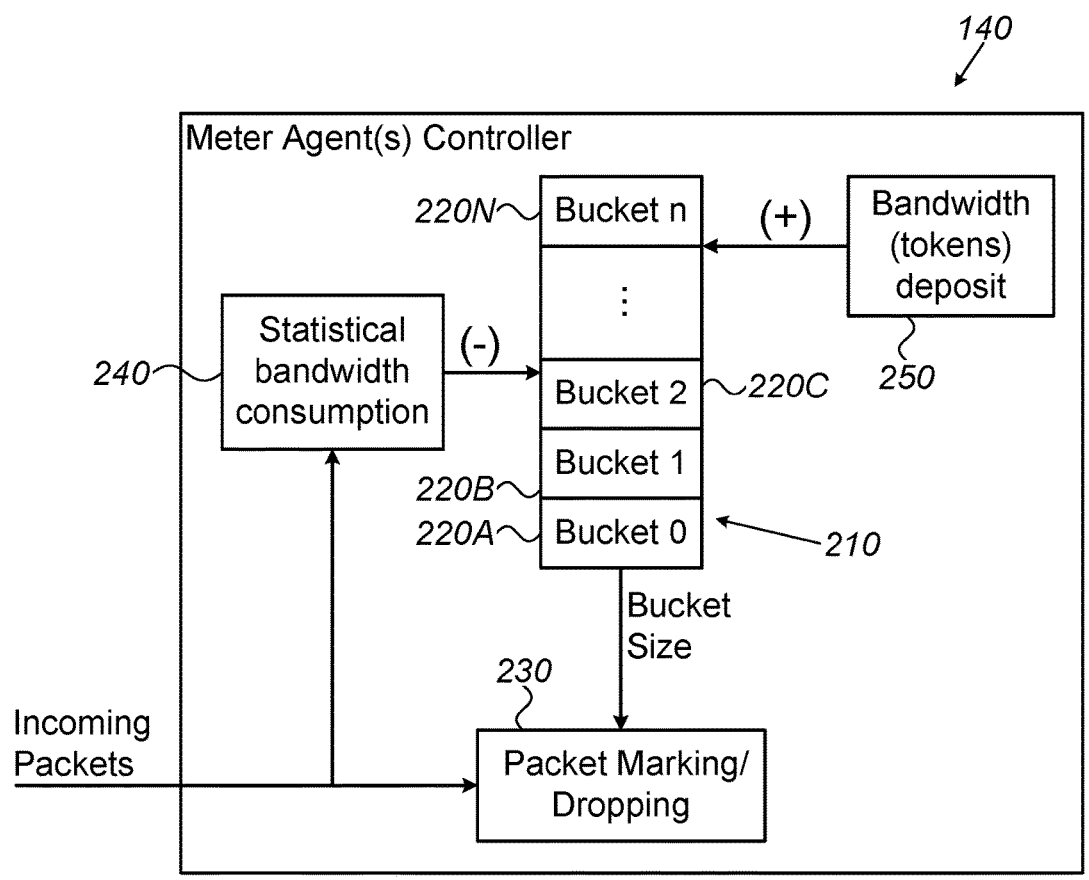
FIG. 2 is a block diagram of a meter agent(s) controller, in accordance with some embodiments of the presently disclosed subject matter.

FIG. 2 is a block diagram of meter agent(s) controller 140, in accordance with some embodiments of the presently disclosed subject matter.

As shown in FIG. 2, meter agents controller 140 may include a memory 210 having one or more memory entries 220 associated with one or more meters. It is assumed in some places of the description that each meter is associated with one memory entry 220 (or in other words that each meter includes one memory entry 220), but in some embodiments, a meter may be associated with more than one memory entry 220, and the description may be adapted accordingly. Memory entries 220 may include counters whose values may be increased and decreased, as appropriate. Four memory entries 220 are shown, namely 220A, 220B, 220C, 220N. In order to increase or decrease a counter, the corresponding memory entry 220 is accessed. A read access is performed to read the value of a counter and/or a write access is performed to update (increase or decrease) the value of a counter. For example, assuming a first token bucket implementation, a bandwidth (tokens) deposit 250 (also referred to herein as "depositor") may be adapted to read any memory entry 220, in order to determine whether or not a token should be added, at the token rate associated with the meter corresponding to the memory entry 220. For each memory entry 220 where it is determined that a token should be added, bandwidth deposit 250 may be adapted to write to the memory entry 220, in order to update the memory entry 220 for the added token. In a second token bucket implementation, bandwidth deposit 250 may not be adapted to perform a separate reading of memory entry 220 at the token rate, bandwidth deposit 250 may be adapted to update memory entry 220 for one or more tokens at a time, and/or bandwidth deposit 250 may be adapted to update memory entry 220 for partial tokens, as will be explained in more detail below. Therefore in both the first and second implementations bandwidth deposit 250 may be adapted to increase the value(s) of the counter(s) by tokens of data units in accordance with a token rate. The token rate and/or token size per meter may be fixed and/or may be adjustable, depending on whether the meter is or is not also part of a distributed meter (as will be described in more detail below).

Additionally or alternatively, there may be read access(es) in order to determine the state of the meter for a particular packet. Continuing with the example, in order to determine the state of the meter when a particular packet is classified to a meter, a packet marking/dropping 230 (also referred to herein as "marker") may be adapted to access the memory entry (e.g. 220A) associated with the meter, in order to read the value(s) of the counter(s) of the meter. If the packet is not in conformance, then packet marking/dropping 230 may be adapted to mark the packet with a high drop or intermediate drop precedence. For example, the decision of whether or not to mark with a high drop or intermediate drop precedence, may be made in-line, that is while the packet or metadata thereof is being processed by packet marking/dropping 230. If the packet is not marked with high drop precedence (or in some embodiments, if the packet is not marked with high drop or intermediate drop precedence), a statistical bandwidth consumption 240 (also referred to herein as "consumer") may be adapted to determine whether or not to access the memory entry (e.g. 220A), in order to update the memory entry (e.g. 220A), as will be explained in more detail below. If the packet is marked with high drop precedence (or in some embodiments, if the packet is marked with high drop or intermediate drop precedence), the memory entry (e.g. 220A) may not be updated.

It is noted that the type of memory used for memory 210 may vary depending on the embodiment. In some embodiments, memory 210 may include any appropriate type(s) of memory such as volatile, non-volatile, erasable, non-erasable, removable, non-removable, writeable, re-writeable memory, for short term storing, for long term storing, etc. For example, memory 210 may be memory, such as Static Random Access Memory ("SRAM"), that includes one port or two ports, and therefore may be accessed (for read or write) once per cycle time or twice per cycle time (the once per cycle time or twice per cycle time being an access rate constraint for memory 210). The cycle time may be defined as the time between the start of one memory access (via a particular port of memory 210) until the time that a next access may be started (via the same port). The cycle time may depend on the cycle of the clock of memory 210, which may or may not be shared with other node components. Every update (write) of memory 210 may be preceded by a read of memory 210, but not every read of memory 210 may necessarily be followed by a write to memory 210.

If memory 210 were instead register memory, then the number of accesses allowed per cycle time may be higher. However, register memory may require more power, area and cost than memory with an access rate constraint. In particular the cost may be prohibitive if meter agents controller 140 includes thousands of meters. Therefore it may be preferable to implement memory 210 using memory with an access rate constraint than using register memory.

Before discussing statistical bandwidth consumption 240 in more detail, an alternative solution which may reduce access to memory 210 for updating will now be discussed with respect to a particular meter associated with memory 210. However, it should be clear that the example may apply to any meter that may be additionally or alternatively associated with memory 210. For example, instead of classifying a particular flow, however it may be defined, to a single particular meter, the particular flow may be classified to any of two or more meters, the two or more meters being in two or more different memories (e.g. the different memories including memory 210 and one or more other memories). For instance, two or more sub-flows of a particular flow may be defined, e.g. dependent on through which input interface (e.g. which switch input interface 110) the sub-flow arrived, and/or e.g. using any other appropriate criterion/criteria for division. A sub-flow (e.g. arriving through any of a group of input interface(s)) may be classified to one of the two or more meters, whereas a sub-flow (e.g. arriving through any of another group of input interface(s)) may be classified to another of the two or more meters. Each of the two or more meters may have an allocated bandwidth that is a fraction of the allocated bandwidth of the particular meter, so that the total of the fractions equals the allocated bandwidth of the particular meter. As the data bandwidths of sub-flows may not necessarily remain constant over time and therefore may be hard to predict, it may be difficult to determine an appropriate fraction for each of the two or more sub-flows. Therefore, for certain meter(s) of the two or more meters the allocated bandwidth fraction(s) may be underutilized. As the two or more meters may be in different memories, there may be less accesses to memory 210 than would have been the case for the particular meter. An underutilization of certain fraction(s) of the allocated bandwidth on the one hand, and an increase in the number of memories on the other hand, may mean that splitting of flows may not be an optimal solution to an access rate constraint of memory. (It is noted that in some embodiments the allocated bandwidth of the particular meter may instead be shared between the two or more meters as per a distributed meter discussed further below).

In accordance with some embodiments of the presently disclosed subject matter, statistical bandwidth consumption 240 may be adapted to not necessarily update memory 210 per packet. That is, statistical bandwidth consumption 240 may not necessarily update memory 210 each time a previous drop precedence of a packet, and/or a state of a meter, to which the packet is classified, allows for update (e.g. due to there being enough allocated bandwidth to accommodate the packet). Statistical bandwidth consumption 240 may be adapted to instead determine whether or not to update memory 210 while such a packet or the metadata thereof is being processed by meter agent(s) controller 140, or more generally while such a packet or the metadata thereof is being processed by the node that includes meter agent(s) controller 140. Statistical bandwidth consumption 240 may be adapted to filter the update statistically and the updated value may be factored by the update probability. Consequently, the load may be reduced on memory 210 and many high rate flows may be measured, because the timing of when memory 210 is updated to reflect the measurement of data bandwidth may be controlled. For example, whether or not the updating is performed while a packet or metadata thereof is being processed by meter agent(s) controller 140, (assuming the previous drop precedence of the packet and/or a state of a meter to which a packet is classified allowing for update) may depend on a result of a comparison between the size of the packet and a value that is at least partly dependent on an access rate constraint for memory 210. Statistical bandwidth consumption 240 may be additionally or alternatively adapted to update memory 210 for a plurality of packets in a write access to memory 210, thereby enabling accesses to memory 210 to not exceed the access rate constraint. Statistical bandwidth consumption 240 may be additionally or alternatively adapted to update memory 210 for one packet in a write access to memory 210, e.g. when such an update may not cause accesses to memory 210 to exceed the access rate constraint.

For instance, it may be assumed that when the previous drop precedence of a packet and/or the state of the meter allows for update, a packet is marked as either low or intermediate drop precedence. Therefore it may be assumed that memory 210 is supposed to be updated for low drop precedence packets and intermediate drop precedence packets. "P" may represent the probability of statistical bandwidth consumption 240 updating a particular memory entry (e.g. 220A) in memory 210 while a current low/intermediate drop precedence packet or the metadata thereof is being processed by meter agent(s) controller 140, the packet having been classified to a flow associated with a meter corresponding to the particular memory entry 220A. If memory entry 220A is to be updated, then memory entry 220A may be updated for the packet and for at least one other packet. For example, memory entry 220A may be updated as per equation 1 below, for the size (also referred to herein as length) of the current packet ("L" data units); as well as for the product of the number of packet(s) (e.g. low drop and/or intermediate drop precedence) classified to the same flow as the current packet since the last update of memory entry 220A (e.g. the number being $$\left(e.g.\text{ the number being}\frac{1-P}{P}\right)$$

) and the average size of such packet(s) (e.g. the average size being E(L) data units). For example, the average size may be calculated by way of an exponential moving average. As another example the average size may be predefined, as will be discussed below. Data units may be any appropriate data units, such as bits or bytes. In other words, statistical bandwidth consumption 240 may be adapted to update memory entry 220A for the following number of data units:

$$L + \frac{1-P}{P}E(L)\text{ data units} \quad \text{(equation 1)}$$

For the sake of illustration, the probability, P, may be assumed to be dependent, at least partly for example, on packet size. The probability of updating memory 210 may be higher for a larger packet size. Continuing with the example, the larger the packet size, the lower the rate of packets in the flow, and therefore the lower the rate of packets with low/intermediate drop precedence. A lower rate of packets with low/intermediate drop precedence, allows for a higher probability of updating memory 210 while a given packet or metadata thereof is being processed, because if memory 210 has an access rate constraint, a lower rate of packets with low/intermediate drop precedence may mean that it is less likely that the access rate constraint of memory 210 will be exceeded.

It may be assumed in such an example where probability is at least partly dependent on packet size, that there may be a certain value that represents a certain packet size (referred to herein as "$L_{max}$") whereby, if all of the packets of all of the flow(s) that are low/intermediate drop precedence at the node are larger than $L_{max}$ then memory 210 may be updated each time a low/intermediate drop precedence packet or metadata thereof is being processed by meter agent(s) controller 140.

In such an example where the probability is at least partly dependent on packet size, the probability may also be at least partly dependent on the value $L_{max}$. For instance, the probability of updating a particular memory entry (e.g. 220A) in memory 210 while a low/intermediate drop precedence packet or metadata thereof is being processed by meter agent(s) controller 140 may be defined as the size of the packet ("L" as discussed above) divided by the certain packet size discussed above. In other words the probability may be defined as $$P = \frac{L}{L_{max}} \quad \text{(equation 2)}$$

Such a definition may mean that the closer L of a given packet is to $L_{max}$ the higher the probability of update while the given packet or metadata thereof is being processed by meter agent(s) controller 140. It may be further assumed, in the example given here that E(L) of equation 1 also equals L, meaning that the average size of the low/intermediate drop precedence packet(s) from the time of the last update is the same as the size of the (current) low/intermediate drop precedence packet. For example, all packets of the same size in the same flow may be considered to be part of a stream that is separately processed from other streams. Substituting the probability as defined by equation 2, and L for E(L) into equation 1, it may be calculated that in this example when statistical bandwidth consumption 240 updates memory entry 220A for the given packet and for at least one other packet, memory entry 220A may be updated for $L_{max}$ data units. In other words, under the above assumptions of the example, the number of data units represented by equation 1 may be calculated as:

$$L + \frac{1-P}{P}E(L)\text{ units} \rightarrow L + \frac{1-\frac{L}{L_{max}}}{\frac{L}{L_{max}}}L\text{ units} = L_{max}\text{ data units}$$

$L_{max}$ may be, for instance, a value that may be at least partly dependent on the access rate constraint. $L_{max}$ may therefore be configurable.

For example, in some cases $L_{max}$ may be at least partly dependent on the ratio of the maximum desired access rate for memory 210 to the access rate constraint for memory 210. It may be assumed, for instance, that there are two ports to memory 210 and therefore a read access and a write access may be allowed per cycle time, the access rate constraint therefore being y=2 accesses per cycle time. With regard to the maximum desired access rate, it may be assumed, say, that there are four processing pipes (n=4) and it is desired that each processing pipe process, say, up to one packet per cycle time (x=1). If all the packets are low/intermediate drop precedence, there may be under such conditions two accesses (one for read and one for write) per packet. Therefore there may be eight accesses (2×n=four for read and four for write) per cycle time for all the packets if all of the packets are low/intermediate drop precedence. The 2xn accesses may be a maximum since if any packet is high drop precedence, write access for the packet may not be necessary. Assuming the first token bucket implementation discussed above, it may also be desired that one token be added, say, each eight cycle times (rate of token addition per cycle time "m"=⅛), meaning two accesses (2m=one for read and one for write) in eight cycle times. The maximum desired access rate may therefore be calculated as 2×n+2m=8.25 accesses per cycle time in this example. The ratio of the maximum desired access rate to the access rate constraint may be calculated as (2×n+2m)/y=4.125.

Continuing with describing the example, but referring to the second token bucket implementation discussed above, the statistical bandwidth consumption 240 and bandwidth deposit 250 may be integrated into an integrated module. In this implementation, instead of a separate read access to particular memory entry 220 (e.g. 220A) at the token rate and a subsequent separate write access to update memory entry 220A for a token if a token should be added, the time may be noted that particular memory entry 220A is accessed for writing with respect to packet(s). The next time memory entry 220A is accessed for writing with respect to packet(s) ("current write time"), the elapsed time from the noted time may be calculated, and memory entry 220A may be updated not only for the packet(s) but also for the token(s) that would have been added during the elapsed time, in accordance with the token rate and token size. Memory entry 220A may be updated only for full token(s) (e.g. 1 token, 2 tokens, etc.) in some embodiments, or may be updated for full and/or partial token(s) (e.g. 1 token, 1.1 tokens, 1.2 tokens, etc.) in some other embodiments. In the former embodiments, the new time that may be noted may be the current write time adjusted for any remainder partial token(s), so that a future update of entry 220A for full token(s) may take into account this remainder. In the latter embodiments, the new time that may be noted may be the current write time. For instance, if the token rate is 1 token of 1000 B per 100 ns, the current write time is 12300 ns and the elapsed time is 350 ns, 3.5 tokens (=350 ns/100 ns) would have been added during the elapsed time. Therefore, either memory entry 220A may be updated for 3500 B (=3.5 tokens×1000B/token) and the current time of 12300 ns may be noted, or memory entry 220A may be updated for 3000B (3×1000 B/token) and the new time that may be noted may be the current write time adjusted for the remainder 0.5 token to 12250 ns (=12300-100 ns×(3500B−3000B)/1000B). Under this second implementation, as there are no separate read and write accesses for token addition the maximum desired access rate reduces to 2×n=8 accesses per cycle time and the ratio of the maximum desired access rate to the access rate constraint may be calculated as (2×n)/y=4.

Additionally or alternatively, the value $L_{max}$ may in some cases be at least partly dependent on the maximum number of bytes for a packet that are transferrable per memory cycle time. For example, a bus width of 50 B, may be assumed. If $L_{max}$ is calculated, for instance, as the product of maximum number of bytes for a packet that are transferrable per memory cycle time and the ratio of the maximum desired access rate to the access rate, then multiplying the ratio of the maximum desired access rate to the access rate constraint, 4.125 (or 4), by 50 B, may result in an $L_{max}$ of 206.25 B (or 200 B).

In some embodiments, any of the values presented above may vary, for example depending on the bus width, the number of ports, the number of processing pipes, the rate of token addition per cycle time, whether or not there is a separate read access relating to adding tokens (and if not, the rate of token addition per cycle time may not be relevant), whether or not the meters are implemented as token buckets (and if not, the rate of token addition per cycle time may not be relevant), the desired number of packets to process per cycle time, etc.

It is noted that the memory access constraint may be present regardless of the number of memory entry/ies 220 in memory 210, and therefore even one flow that is of a high rate may in some cases be limited by the memory access constraint.

As mentioned above, a meter may have one token bucket or two token buckets in some embodiments. For example if there are two token buckets per meter then depending on the embodiment, the first bucket, the second bucket, or both may be updated by statistical bandwidth consumption 240 for the number of data units of equation 1, e.g. $L_{max}$, when updated.

Figure 3:
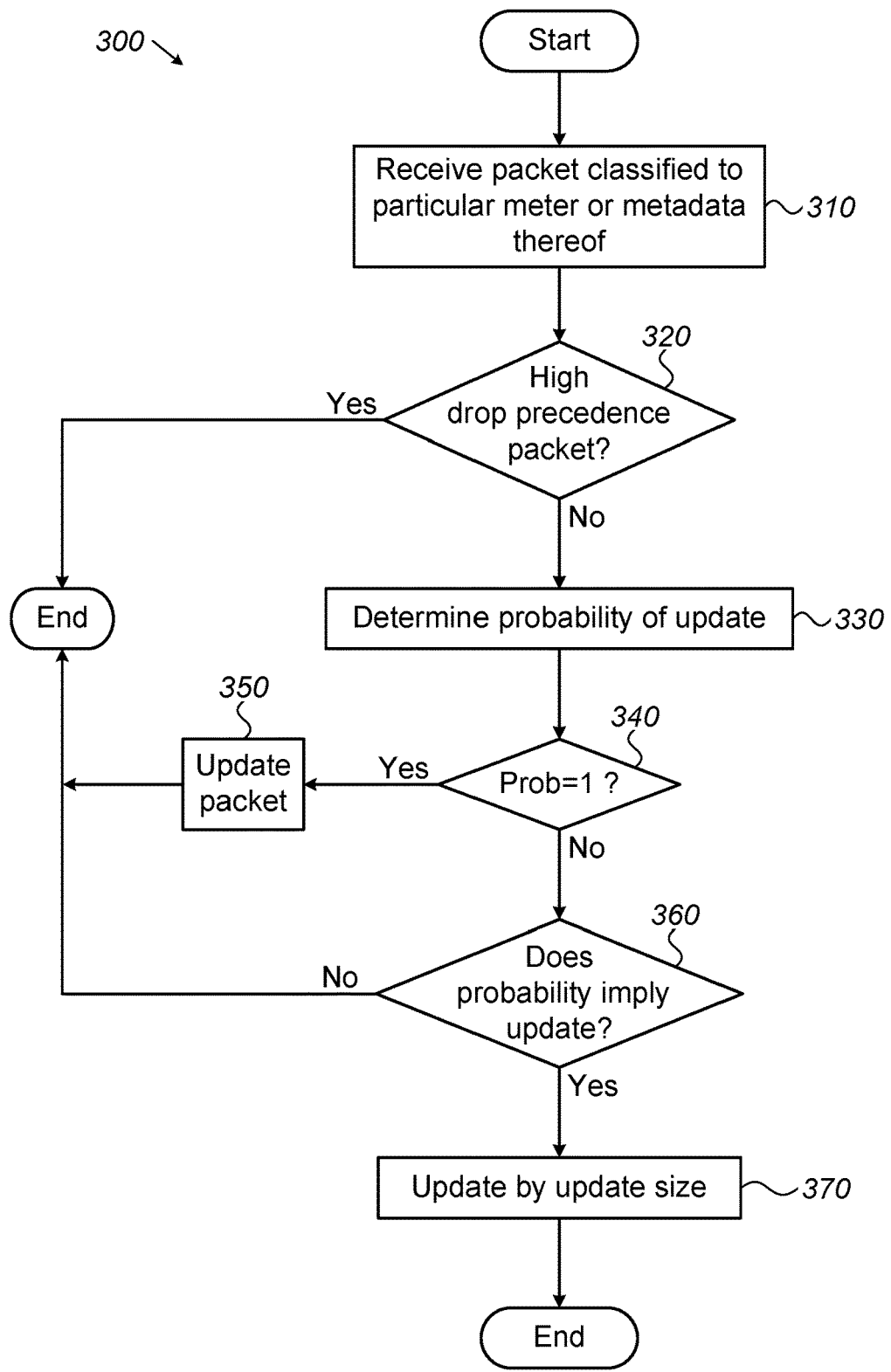
FIG. 3 is a flowchart of a method performed by a meter agent(s) controller, in accordance with some embodiments of the presently disclosed subject matter.

FIG. 3 is a flowchart of a method 300 performed by meter agent(s) controller 140, in accordance with some embodiments of the presently disclosed subject matter. Method 300 may allow control of the timing of when memory 210 is updated to reflect the measurement of data bandwidth, so as to comply with an access rate constraint of memory 210.

In stage 310, meter agent(s) controller 140 may receive a ("current") packet classified to a particular meter associated with a particular memory entry 220 (e.g. 220A), or the metadata of the packet, e.g. from packet header processing 120. It is assumed in the description of method 300 that the meter is associated with one particular memory entry 220 (e.g. 220A), but in some embodiments, the meter may be associated with more than one entry 220, and method 300 may be adapted accordingly. In stage 320, it may be determined if the current state of the meter and/or a previous drop precedence of the packet implies that the packet is to be marked with a high drop precedence. For example, meter agent(s) controller 140 (such as packet marking/dropping 230) may be adapted to determine if the packet is to be marked with a high drop precedence. If the packet is to be marked with high drop precedence, then method 300 may end for the current packet. If the packet is not to be marked with high drop precedence, then in stages 330, 340 and/or 360 statistical bandwidth consumption 240 may determine whether or not particular memory entry 220A is to be updated while the packet or the metadata thereof is being processed by meter agent(s) controller 140. For example, in stage 330 a probability may be determined that is at least partly dependent on the size of the packet and the value $L_{max}$. If the probability is 1 ("yes" in stage 340), then in stage 350, statistical bandwidth consumption 240 may update particular memory entry 220A for the packet, e.g. by subtracting the size of the packet similarly to a deterministic meter, or in other words similarly to a non-statistical meter. Method 300 then ends for the packet.

If the probability is instead not "1" ("no" in stage 340) then in stage 360 statistical bandwidth consumption 240 may determine if the probability implies that particular entry 220A is to be updated while the packet or the metadata thereof is being processed by meter agent(s) controller 140. If in stage 360, it is determined that the probability implies that particular entry 220A is to be updated, then in stage 370 statistical bandwidth consumption 240 may update particular memory entry 220A for the packet and for at least one other packet, e.g. for at least one other low drop/intermediate drop precedence packet classified to the meter since the last update for packet(s) classified to the meter. Statistical bandwidth consumption 240 may update particular memory entry 220A, for instance, by subtracting an update size. The update size may be defined for example by equation 1. Method 300 may then end for the packet.

For example, in some cases, in order to determine the probability in stage 330, the size of the packet may be determined, e.g. from the packet or the metadata of the packet. Based at least partly on the size of the packet and the value of $L_{max}$, the probability may be calculated or may be retrieved, if previously calculated for this size. The probability may be calculated or may have been calculated as being 1, for instance, if a result of a comparison of the size of the packet to a value $L_{max}$, includes that the size of the packet, is equal to or larger than $L_{max}$. Such a comparison may be performed currently or may have been performed before for this size. The probability may be calculated or may have been calculated as being less than 1 if a result of the comparison includes that the size of the packet is less than $L_{max}$. The result of the comparison may further include the ratio of the size of the packet, to the value, $L_{max}$, the ratio being the probability. Such a probability may imply that the particular entry 220A is to be updated, or is not to be updated. For instance, if the probability is 0.25 for packets of a given size, then on average, particular memory entry 220A may be updated for one packet out of four, while the packet or metadata thereof is being processed by meter agent(s) controller 140. In terms of the size of the update in stage 370, if the probability equaled the current packet size divided by a $L_{max}$ as described above, and the at least one other packet for which particular memory entry 220A is to be updated had the same packet size, then the update size may be $L_{max}$ as discussed above.

Additionally or alternatively, the determination of the probability in stage 330, and the subsequent stages 340 and 360 may include random number generation, the random number generation being at least partly dependent on the value of $L_{max}$. For instance, a number between zero and $L_{max}$ may be randomly generated. The size of the packet may be compared to the randomly generated number. If the size of the packet is larger than or equal to the randomly generated number, then particular memory entry 220A is to be updated while the packet or metadata thereof is being processed by meter agent(s) controller 140. If the size of the packet is less than the randomly generated number, then particular memory entry 220A is not to be updated while the packet or metadata thereof is being processed by meter agent(s) controller 140.

In accordance with some embodiments of the presently disclosed subject matter, there may therefore be provided a network node in a packet communication network, the network node comprising: a memory including one or more memory entries associated with one or more meters, the memory characterized by an access rate constraint; and a consumer, adapted to update the memory for a plurality of packets in a write access, thereby enabling accesses to the memory to not exceed the access rate constraint. In some of these embodiments of the network node, the consumer may be further adapted to determine whether or not to update the memory while a packet or metadata thereof is being processed by the network node. In some examples of these embodiments, the consumer being adapted to determine whether or not to update the memory may include the consumer being adapted to determine to update the memory for the plurality of packets, including the packet and at least one other packet, based at least partly on a probability, the probability being at least partly dependent on a size of the packet and a value, the value being at least partly dependent on the access rate constraint. For example, the consumer may be adapted to determine to update the memory if the size of the packet is equal to or larger than a number randomly generated between zero and the value. In some instances where the at least one other packet may be of equal size to the packet, the consumer may be adapted to update the memory for the packet and for the at least one other packet by updating the memory by the value. The value may, for example, also be at least partly dependent on at least one of: a maximum number of bytes for a packet that are transferrable per memory cycle time to the apparatus, or a maximum desired access rate. The maximum desired access rate may, for instance, be at least partly dependent on at least one of a rate of token addition per cycle time to any of the one or more meters, quantity of ports to the memory, quantity of packets per memory cycle time to be processed by a processing pipe, or a quantity of processing pipes. In some embodiments where the consumer is adapted to update the memory for a plurality of packets in a write access, the consumer may be further adapted to update the memory for one packet in a write access.

In accordance with some embodiments of the presently disclosed subject matter, there may be provided a method comprising: providing a memory that includes one or more memory entries associated with one or more meters at a network node of a packet communication network, wherein the memory is characterized by an access rate constraint; and updating the memory for a plurality of packets in a write access, thereby enabling accesses to the memory to not exceed the access rate constraint. In some of these embodiments, the method may further comprise: determining whether or not to update the memory while a packet or metadata thereof is being processed at the network node. In some examples of these embodiments, the determining whether or not to update the memory may include determining to update the memory for the plurality of packets, including the packet and at least one other packet, based at least partly on probability, the probability being at least partly dependent on a size of the packet and a value, the value being at least partly dependent on the access rate constraint. For example, it may be determined to update the memory if the size of the packet is equal to or larger than a number randomly generated between zero and the value. In some instances where the at least one other packet may be of equal size to the packet, updating the memory for the packet and for the at least one other packet may include updating the memory by the value. The value may, for example, also be at least partly dependent on at least one of: a maximum number of bytes for a packet that are transferrable per memory cycle time to the apparatus, or a maximum desired access rate. The maximum desired access rate may, for instance, be at least partly dependent on at least one of a rate of token addition per cycle time to any of the one or more meters, quantity of ports to the memory, quantity of packets per memory cycle time to be processed by a processing pipe, or a quantity of processing pipes. In some embodiments where the method includes updating the memory for a plurality of packets in a write access, the method may further comprise: updating the memory for one packet in another write access. In accordance with some embodiments, the subject matter may contemplate a computer program product comprising a (e.g. non-transitory) computer readable medium having computer readable program code embodied therein for executing one or more of the embodiments of such method(s) or part(s) of method(s) disclosed herein with respect to managing one or more meters at a network node.

Describing now in more detail distributed meters, although not necessarily so in some embodiments, a particular distributed meter may be used for a single measured entity in a packet communication network. The type of measured entity may vary depending on the embodiment and may include any appropriate measured entity such as an individual, group of individuals, organization, company, partnership, etc. In one example the single measured entity may be a particular customer such as a particular tenant in a public cloud. A public cloud may include infrastructure that is shared among multiple tenants. Such tenants may receive compute, storage and networking services from the cloud operator. Such services and metrics regarding the services may be defined in an SLA between the cloud operator (here, the service provider) and the tenant (here, the customer), and therefore may vary for different tenants. Networking services may be realized by bandwidth management. Bandwidth management may include rate limiting of traffic, scheduling of traffic according to priority and queueing of temporarily accumulated data.

As is known in the art cloud computing is a model for enabling ubiquitous, convenient, on-demand network access to a shared pool of configurable computing resources (e.g., networks, servers, storage, applications, and services) that may be rapidly provisioned and released with minimal management effort or service provider interaction. The cloud model may comprise at least five characteristics (on-demand self-service, broad network access, resource pooling, rapid elasticity and measured service), at least three service models (software as a service, platform as a service, infrastructure as a service), and at least four deployment models (private cloud, community cloud, public cloud, and hybrid cloud). In a public cloud, the cloud infrastructure is provisioned for open use by the general public. The cloud infrastructure may be owned, managed, and operated by a business, academic, or government organization, or some combination of the above. The characteristic of measured service may mean that cloud systems may automatically control and optimize resource use by leveraging a metering capability (typically on a pay-per-use or charge-per-use basis) at some level of abstraction appropriate to the type of service (e.g., storage, processing, bandwidth, and active user accounts). Resource usage may be monitored, controlled, and reported, providing transparency for both the provider and consumer of the utilized service. Distributed meters, as described herein, may allow an improved measured service to characterize a cloud that includes such distributed meters.

Distributed meters may not necessarily be limited to measured entities. The use of distributed modules may vary depending on the embodiment, and may include any appropriate use. For example, a particular distributed meter may be used per measured entity, per certain flows of a measured entity, per network node, per tunnel, per application (e.g. HTTP, VOIP), per IP sub-network, etc. However, for the purposes of illustration, some examples herein may describe the use of a distributed meter with reference to a distributed meter per measured entity where the measured entity is a tenant.

Figure 4:
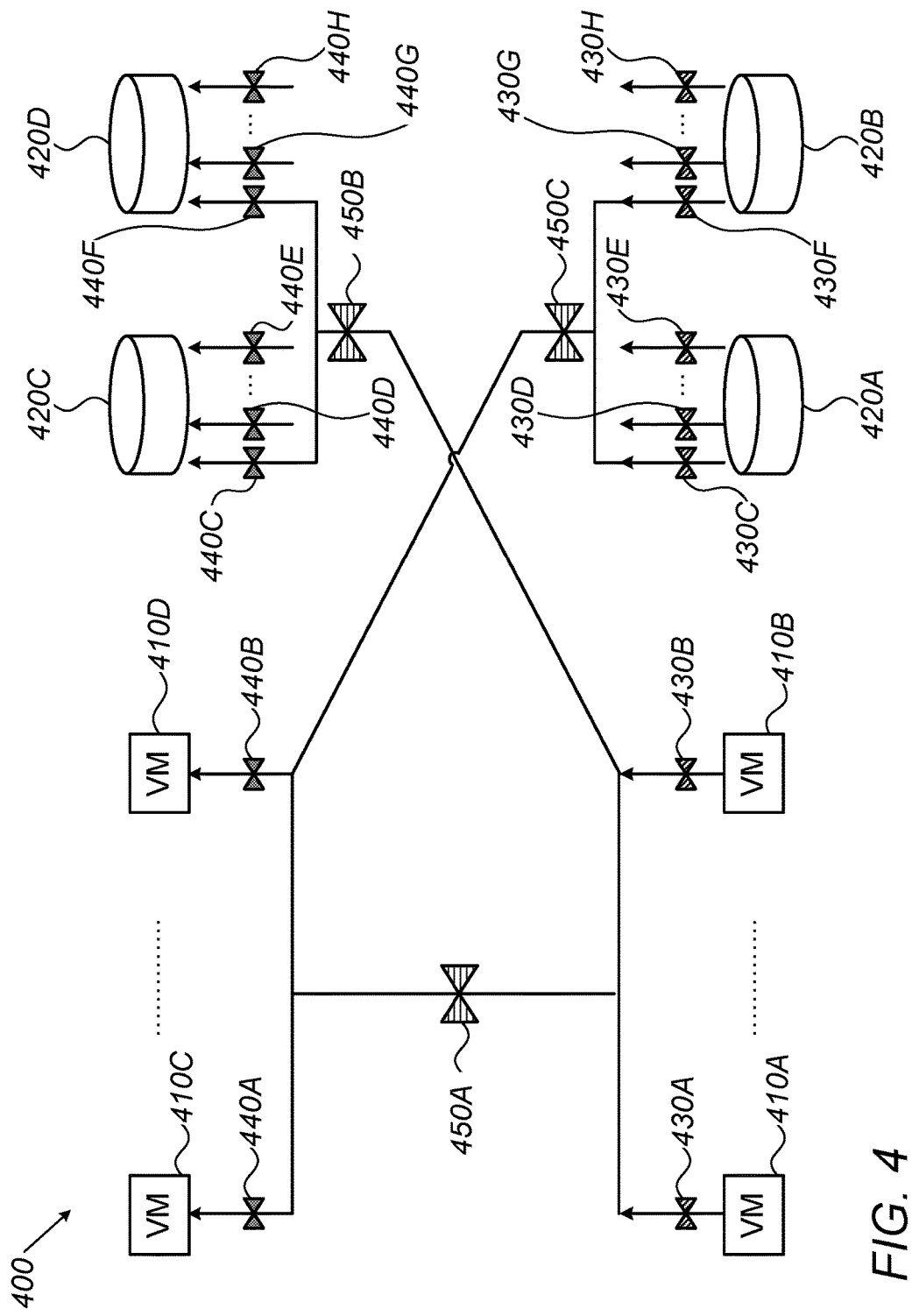
FIG. 4 illustrates a bandwidth management model implemented in a network, in accordance with some embodiments of the presently disclosed subject matter.

FIG. 4 illustrates a bandwidth management model implemented in a network 400, in accordance with some embodiments of the presently disclosed subject matter.

Network 400 may be a network of a cloud. In accordance with an SLA, a tenant may be allocated one or more elements such as virtual machines and/or storage blocks. For example, the tenant may be allocated one or more virtual machines 410 (of which four virtual machines are shown in FIG. 4, namely 410A, 410B, 410C, and 410D), residing in physical servers. The tenant may additionally or alternatively be allocated one or more storage blocks residing in storage machines 420 (of which four storage machines are shown in FIG. 3, namely 420A, 420B, 420C, and 420D).

It is noted that virtual machines and storage blocks allocated to a single tenant may not necessarily reside in the same server/storage machine. Moreover, a particular server or storage machine may include virtual machines or storage blocks associated with a plurality of tenants. The number of virtual machines, storage blocks, or associated tenants per server/storage machine may vary depending on the embodiment.

In accordance with the SLA, one of the metrics that the cloud operator may commit to may be an amount of traffic that the cloud operator forwards in network 400, or in other words within the cloud. For example the traffic may be from various virtual machines 410 allocated to the tenant and/or to various storage blocks allocated to the tenant, residing in various storage machines 420. The operator may enforce the committed rate (e.g. the committed rate being an example of total allocated bandwidth discussed above), for example, by measuring the traffic rate (or in other words, the data bandwidth) injected into network 400 by elements associated with a tenant. One or more ingress meters 430 (of which eight ingress meters are shown, namely 430A, 430B, 430C, 430D, 430E, 430F, 430G, and 430H) may be adapted to measure the injected traffic rate. Additionally or alternatively, the operator may enforce a committed rate that the operator commits to allow out of network 400 (e.g. to links out to storage blocks/virtual machines) by measuring the traffic rate going into elements associated with the tenant. One or more egress meters (of which eight egress meters are shown, namely 440A, 440B, 440C, 440D, 440E, 440F, 440G, and 440H), for example, may be adapted to measure the traffic rate going into such elements. Additionally or alternatively, the operator may enforce the committed amount that the cloud operator commits to forward in network 400 by measuring the traffic rate injected by the tenant and/or going to the tenant by one or more aggregated tenant meters 450, each of which may be adapted to measure data bandwidth to and/or from multiple elements associated with the tenant. For example, three aggregated tenant meters are shown in FIG. 4, namely 450A, 450B, and 450C. It is assumed in the discussion of FIG. 4 that the meters shown in FIG. 4 act independently of one another.

However, in order to enforce a committed amount in network 400, the committed amount may need to be divided into sub-amounts corresponding to various paths in the networks, not all of which may pass via the same meter. For example the committed rate may be divided among ingress meters 430, among egress meters 440, or among aggregated tenant meters 450. However, in such a case of division into sub-amounts, the tenant may not be measured correctly. For the sake of example, division of the committed rate among ingress meters 430 is now described, although similar conclusions may apply for division of the committed rate among egress meters 440 or among aggregated tenant meters 450. For instance, in some cases, some traffic of the tenant (e.g.

traffic whose data rate is measured by a first plurality of ingress meters 430) may consume bandwidth (or in other words have a data bandwidth) that is higher than the portions of the committed rate assigned to ingress meters 430 in the first plurality. Other traffic of the tenant (e.g. whose data rate is measured by a second plurality of ingress meters 430) may consume bandwidth that is lower than the portions of the committed rate assigned to the ingress meters 430 in the second plurality, but all together the traffic rate of the tenant may not exceed the committed rate for the tenant. However, the traffic with the data bandwidth that is higher than the portions of the committed rate assigned to the first plurality of ingress meters 430 may anyhow experience unjustified marking of packets as high drop precedence packets (or in some embodiments unjustified marking of packets as high drop and intermediate drop precedence packets). Additionally or alternatively, the cloud operator may actually provide more than the committed rate to the tenant, in order to allow for peaks in the rate of traffic measured by different ingress meters 430. For example, if the committed rate is 1 Tbit/sec and there are ten ingress meters 430, then instead of, say, each ingress meter 430 being assigned 100 Gbit/sec, each ingress meter 430 may be assigned, say, 300 Gbit/sec, in order to account for peaks in the rate (or in other words, bursts) and therefore the total assigned rate may really be 3 Tb/sec, rather than the committed rate of 1 Tbit/sec. In such a case, the total allocated bandwidth may in effect be the total assigned rate which is larger than the committed rate.

It may be better if there were instead a single node in network 400 where a single aggregated tenant meter 450 may be located that is adapted to measure the rate of all traffic injected by and/or going to a tenant. Such a node may be common to all paths of the traffic. In such a case, ignoring the possibility of intermediate drop precedence, and ignoring any previous drop precedence of a packet, if the rate of traffic for a tenant is below the agreed limit (or in other words below the committed rate), the packet may be considered to be a conforming packet and may be forwarded with a low drop precedence. If the rate of the traffic exceeds the agreed limit, the packet may be considered to be a non-conform packet and may be marked with a high drop precedence. Such a packet may be dropped or may be the first to be dropped in one of the next nodes in the network if congestion occurs. However, network 400 as illustrated in FIG. 4 does not have such a node.

It should be understood that there may be other reasons that a single meter may not measure the rate of all relevant traffic, in addition to, or instead of, there not being a single common node where such a meter may be located. For example, the classification of traffic may cause relevant traffic to be classified to two or more meters even though the meters may be located at the same node.

Typically, although not necessarily, a data center, for example in a public cloud, may be built in accordance with a spine leaf configuration with a Clos interconnect topology. In such a data center there may be multiple paths between two endpoints. As a result even packets traveling between the same two endpoints and having the same 5-tuple may pass through different paths, where in some cases the paths may be disjoint because the paths may have no common node between the two endpoints. It is noted that in such a case, a meter at the source endpoint may measure the rate of such traffic. However, when a tenant has multiple injection points (e.g. due to multiple possible source endpoints) into a network, the traffic injected by the tenant may pass through various paths, with no common node necessarily existing for all of the paths.

Figure 5:
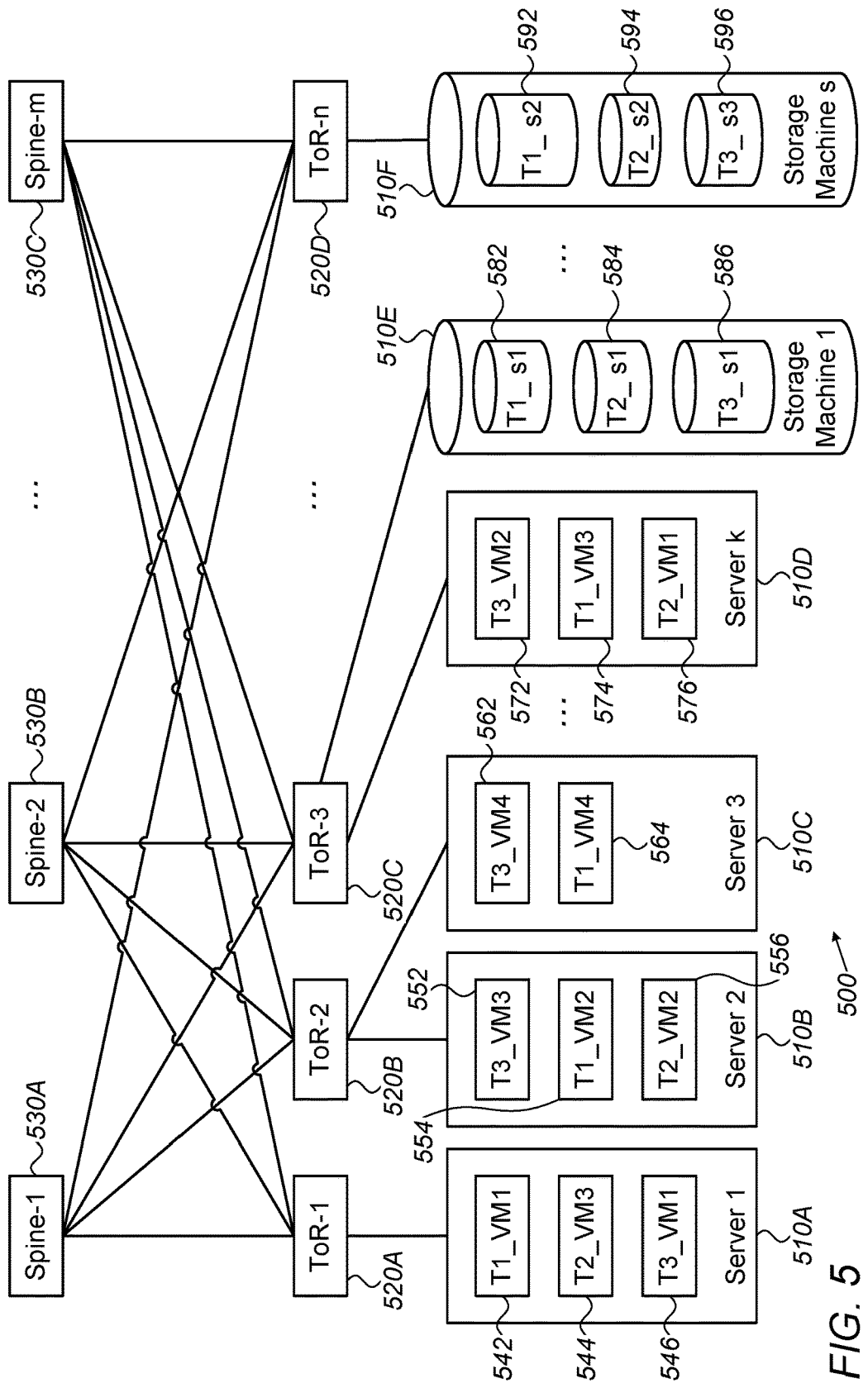
FIG. 5 illustrates a data center network in a public cloud, in accordance with some embodiments of the presently disclosed subject matter.

FIG. 5 illustrates a data center network 500 in a public cloud, in accordance with some embodiments of the presently disclosed subject matter. In the spine leaf topology shown in FIG. 5, the physical servers and storage machines 510 (of which Server 1 510A, Server 2 510B, Server 3 510C, Server <k> 510D, Storage machine_1 510E, and storage machine <s> 510F are shown) may be arranged in racks (not shown), and may be connected to access switches named Top-of-Rack switches 520 (also referred to herein as "ToRs"). Four ToRs are shown in FIG. 5, namely ToR-1 520A, ToR-2 520B, ToR-3 520C, and ToR-n 520D. ToRs 520 may be further connected to aggregation switches called Spines 530 (also referred to herein as "spine switches"), where each ToR may be connected to part of spine switches 530 or to all spine switches 530. Shown in FIG. 5 are three spine switches 530, namely spine-1 530A, spine-2 530B, and spine-m 530C. The connectivity of ToRs and Spines may implement a Clos network where there may be multiple paths between any two endpoints.

The public cloud of FIG. 5 may host one or more tenants. In FIG. 5, elements allocated to three tenants are shown, denoted with the prefixes T1 for tenant 1, T2 for tenant 2, and T3 for tenant 3. Each of the tenants is assigned a few virtual machines ("VM"s) hosted in different physical servers. The virtual machines of a tenant share an isolated storage amount (also referred to herein as 'storage block(s)") in multiple storage machines. For example, server-1 510A may be adapted to host three virtual machines, namely T-1_VM1 542 assigned to tenant 1, T2-VM3 544 assigned to tenant 2, and T-3_VM1 546 assigned to tenant 1. Server-2 510B may be adapted to host three virtual machines, namely T-3_VM3 552 assigned to tenant 3, T1-VM2 554 assigned to tenant 1, and T-2_VM2 556 assigned to tenant 2. Server_3 510C may be adapted to host two virtual machines, namely T3-VM4 562 assigned to tenant 3 and T-1_VM4 564 assigned to tenant 1. Server<k> 510D may be adapted to host three virtual machines, namely T-3_VM2 572 assigned to tenant 3, T1_VM3 574 assigned to tenant 1, and T-2_VM1 576 assigned to tenant 2. Storage machine 1 510E may be adapted to include storage block(s) T1_S1 582 assigned to tenant 1, T2_S1 584 assigned to tenant 2, and T3_S1 586 assigned to tenant 3. In FIG. 5 there are more storage blocks T3_S1 586 illustrated than storage block(s) T1_S1 582 or storage block(s) T2_S1 584. Storage machine<s> 510F may be adapted to include storage block(s) T1_S2 592 assigned to tenant 1, storage block(s) T2_S2 594 assigned to tenant 2, and storage block(s) T3_S3 596 assigned to tenant 3. In FIG. 5 there are more storage blocks T1_S2 592 illustrated than there are storage blocks(s) T3_S3 596, and that there are more storage blocks T3_S3 596 illustrated than storage blocks T2_S2 594. Traffic of tenant 1, for example, may pass through disjoint paths, such as:

T1_VM1 542→TOR-1 520→Spine-2 530B→TOR-3 520C→T1_VM3 552, or

T1_VM2 554→TOR-2 520B→Spine-m 530C→TOR-n 520D→T1_S2 592

Therefore, measurement of the rate of traffic of a tenant, such as tenant 1 may be problematic. The number and configuration of physical servers and storage machines, and the assignment of elements to tenants are not limited by FIG. 5, and may vary depending on the embodiment. Moreover, the inability to measure the rate of traffic when the traffic may pass through various paths and there is no common node to all of the paths may be problematic not necessarily only for a spine leaf topology, nor not necessarily only for an implementation involving tenants in a public cloud. Furthermore, the inability to measure the rate of traffic may also occur in some cases for traffic passing through the same node. Consequently, the discussion of distributed meters is not limited herein to any specific network topology, nor to any particular implementation.

In some embodiments, a distributed meter may be a "virtual" entity that includes, at least, a plurality of physical meters adapted to cooperate and act as a single meter. (A meter may be termed a physical meter if the meter is located at a node and may therefore measure a rate of traffic passing through the node that is classified to the meter). A distributed meter, in some of such embodiments, may rate-limit flows (e.g. from multiple sources and/or to multiple destinations) while considering the dynamics of the flows, and act upon the flows in a way that attempts to ensure that the same percentage of traffic is passed through all rate limiters.

Figure 6A:
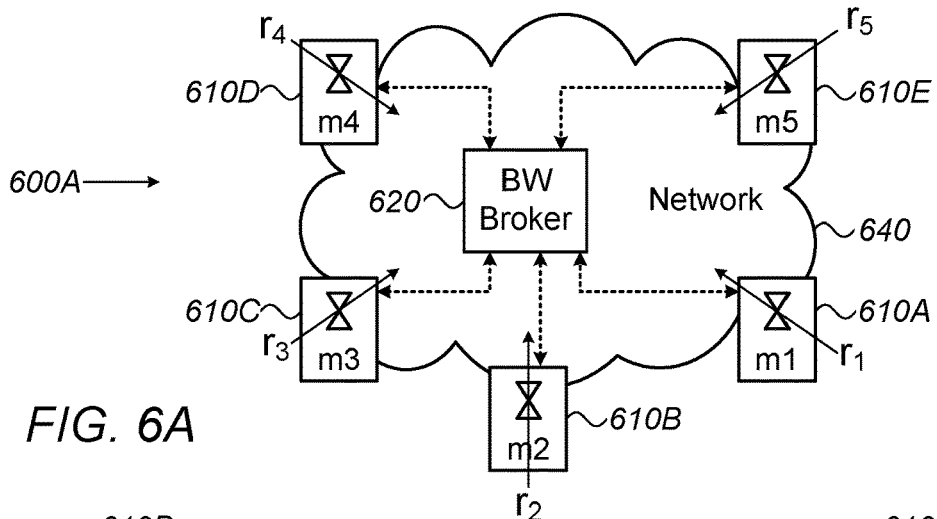
FIGS. 6A and 6B illustrate a distributed meter, in accordance with some embodiments of the presently disclosed subject matter.
Figure 6B:
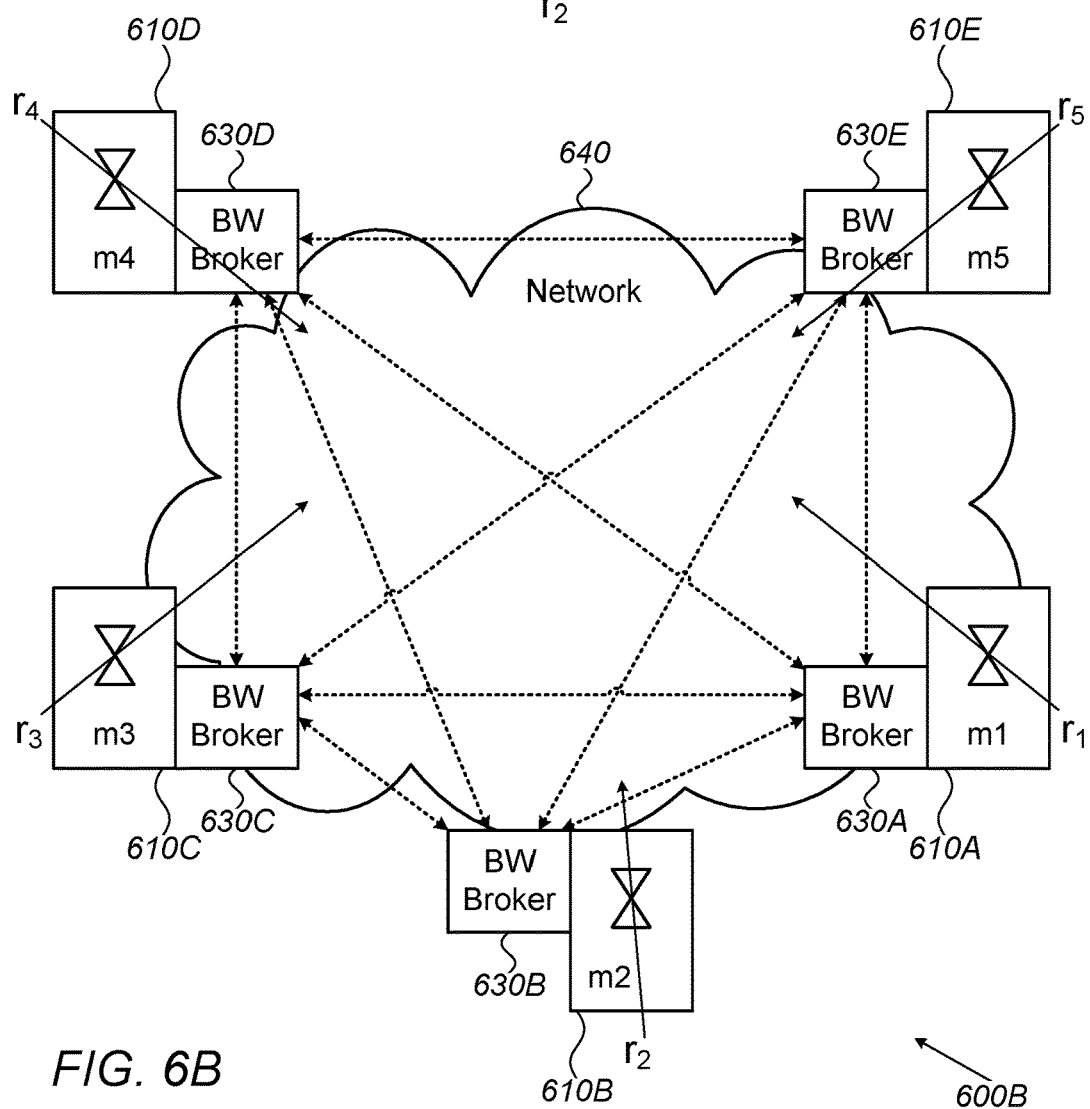

Reference is now made to FIGS. 6A and 6B, illustrating a distributed meter 600, in accordance with some embodiments of the presently disclosed subject matter.

FIG. 6A illustrates a distributed meter 600A (which is an example of distributed meter 600). Distributed meter 600A may include a plurality of (physical) meters 610. In FIG. 6A, five meters 610 are shown, namely m1 610A, m2 610B, m3 610C, m4 610D, and m5 610E, but in other embodiments there may be more or less meters 610. Distributed meter 600A may also include a bandwidth broker 620, referred to herein as a "centralized broker". The communication, or in other words the exchange of bandwidth management messages (also referred to herein as "messages"), between any of meters 610 and bandwidth broker 620 may be via a network 640.

FIG. 6B illustrates a distributed meter 600B (which is an example of distributed meter 600), including a plurality of (physical) meters 610. As in FIG. 6A, in FIG. 6B, five meters 610 are shown, namely m1 610A, m2 610B, m3 610C, m4 610D, and m5 610E, but in other embodiments there may be more or less meters 610. Distributed meter 600B may also include a plurality of bandwidth brokers 630, referred to herein as "dispersed brokers" or "distributed brokers". In FIG. 6B, five bandwidth brokers 630 are shown, namely 630A, 630B, 630C, 630D, and 630E, but in other embodiments there may be more or less bandwidth brokers 630. Although in FIG. 6B there is the same number of bandwidth brokers 630 as meters 610, such parity may not necessarily be the case in all embodiments. In FIG. 6B, a certain meter 610 may be assigned to a particular bandwidth broker 630, but in other embodiments, any of a certain group of meters 610 may be assigned to a particular bandwidth broker 630. The communication (or in other words the exchange of messages) between bandwidth brokers 630 and meters 610 may be internal to a node (e.g. if both the bandwidth broker 630 and meter 610 are within a given node), via network 640, and/or via any other means (e.g. a local connection). Bandwidth brokers 630 may be adapted to communicate with one another, e.g. within a node, via network 640, and/or via any other means.

In distributed meter 600, there may be six to ten meters 610 per distributed meter, or more or fewer per distributed meter, depending on the embodiment. Each meter 610 in FIG. 6A may be statistical (as described above) or deterministic (as will be explained below), and therefore distributed meter 600 may include statistical and/or deterministic meters. If there may be communication between any two of meters 610 shown, the communication may be internal to the node (if the two meters 610 are at the same node), via network 640, and/or via any other means.

When bandwidth broker 620 is centralized, as in FIG. 6A, bandwidth broker 620 may be adapted to acquire information regarding each meter 610 in FIG. 6A. When bandwidth brokers 630 are dispersed rather than centralized, as in FIG. 6B, each broker 630 may be adapted to acquire local information, that is information on one or a group of meters 610 in FIG. 6B, and perhaps some estimations regarding the other meters 610 in FIG. 6B, e.g. from other broker(s) 630. However, dispersed brokers 630 may not represent a single point of failure, as may centralized broker 620, and dispersed brokers 630 at the respective locations of dispersed brokers 630 may be less congested than centralized broker 620, e.g. due to load balancing among dispersed brokers 630.

The meter rate (also referred to herein as total allocated bandwidth) of distributed meter 600, e.g. as defined by an SLA, may be denoted as M. The traffic rate for distributed meter 600 may be denoted as R. The meter rate of a given meter 610 (also referred to herein as the allocated bandwidth of the given meter 610), may be denoted as $m_i$ where i is indicative of the label of the meter 610. For instance, the meter rate of meter m1 610 may be denoted as $m_1$. The traffic rate measured by a given meter may be denoted as $r_i$ where i is indicative of the label of the meter. For instance, the traffic rate measured by meter m1 610 may be denoted as $r_1$.

In some embodiments, distributed meter 600 may be adjusted, e.g. dynamically, in an attempt to achieve the following conditions:

If M>R, all meters pass all traffic (e.g. no packets marked with high drop precedence), and $$\text{If } M < R, \text{ for every } i, \frac{m_i}{r_i} = \frac{M}{R}$$

It is noted that in some embodiments implementation of distributed meter 600 may attempt to achieve the above conditions. However in some of such embodiments, the above conditions may not necessarily be achieved or may not necessarily be achieved at all times. Moreover, in some other embodiments, usage of distributed meter 600 may not attempt to achieve the above conditions, but may still allow adjustment of meter rates of meters 610 based on discrepancies between the traffic rates measured by meters 610 and the meter rates of meters 610. In some of such embodiments, the ratio between the meter rate and the traffic rate of a given meter 610 may on average over the lifetime of meters 610 (or over a sufficiently long period of time that may be shorter than the meter lifetime) be more similar to the ratio between the sum of the meter rates for all meters 610 and the sum of the traffic rates for all meters 610, than would be the case if there were no adjustment of meter rates of meters 610 based on discrepancies between the data rates measured by meters 610 and the meter rates of meters 610. For example, as the traffic rates change over time, the various meters may measure the traffic rates and detect if there are discrepancies between the traffic rates measured by meters 610 and the meter rates of meters 610. If there is a discrepancy for a particular meter 610, the particular meter 610 may release at least part of the meter rate thereof, or may attempt to procure an additional allocation of meter rate.

Although FIGS. 6A and 6B illustrate one or more bandwidth brokers 620 or 630 in distributed meter 600, the inclusion of bandwidth broker(s) 620 or 630 may not be necessary in certain embodiments. For example, in certain embodiments, the inclusion of meters 610 and bandwidth broker(s) 620 or 630 may be a logical view for dividing tasks among meters 610 and broker(s) 620 or 630. In such embodiments, for instance, if broker tasks and meter tasks are performed at the same node, e.g. in the same switch, the tasks may be considered to be performed by a particular meter 610 with enlarged functionality at the node. In such an instance, meters 610 (with or without broker functionality) may be adapted to communicate directly with particular meter 610. For example, if there is no broker in distributed meter 600, a given meter 610 with excessive (or in other words, more than is necessary) allocated bandwidth in accordance with at least one criterion, compared to the data bandwidth measured by given meter 610, may be adapted to release at least part of the allocated bandwidth to another meter 610 (e.g. randomly selected, selected due to an appropriate criterion such as not having recently released bandwidth to the given meter 610, etc.). Similarly, if there is no broker in distributed meter 600, a given meter 610 having insufficient (or in other words less than is necessary) allocated bandwidth in accordance with at least one criterion, compared to the data bandwidth measured by given meter 610, may be adapted to request an allocation of additional bandwidth from another meter 610 (e.g. randomly selected, selected due to an appropriate criterion such as not having recently sent a request for bandwidth from the given meter 610, etc.). More details regarding communication without brokers is discussed below in the introduction to the description of FIG. 13.

It should be evident that what is considered insufficient allocated bandwidth or excessive allocated bandwidth in accordance with at least one criterion may vary depending on the embodiment. Depending on the implementation, a certain discrepancy between an allocated bandwidth and a data bandwidth may or may not be considered indicative of excessive allocated bandwidth, and similarly depending on the embodiment a particular discrepancy between an allocated bandwidth and a data bandwidth may or may not be considered indicative of insufficient allocated bandwidth. In some cases, the implementation of the at least one criterion may influence whether or not the allocated bandwidth is considered excessive or insufficient. More details on possible implementations are given below with reference to FIG. 10.

Although FIGS. 6A and 6B illustrate one distributed meter, in some embodiments, there may be more than one distributed meter 600 in a network. For example, one or more meters 610 at a particular node may correspond to a first distributed meter 600, one or more other meters 610 at the particular node may correspond to a second distributed meter 600, etc. Depending on the embodiment, all distributed meters 600 in the network may or may not include at least one meter 610 at every node having meter(s) 610. In embodiments with more than one distributed meter 600 in the network, and with at least one bandwidth broker 620 or 630, bandwidth broker(s) 620 or 630 may broker for more than one distributed meter 600. Depending on the embodiment, each bandwidth broker 620 or 630 may broker for all distributed meters 600 in the network, each bandwidth broker 620 or 630 may broker for only part of distributed meters 600, or different bandwidth brokers 620 or 630 may broker for different distributed meters 600. In some embodiments, if there is extra bandwidth in a certain distributed meter, the bandwidth broker may share the extra bandwidth with other distributed meters in order to maximize the traffic in the network; or may keep the excess bandwidth for later use by the certain distributed meter or by other distributed meters. A network may in some embodiments include many distributed meters (e.g. 100,000 or more or fewer distributed meters). The number of centralized brokers in such embodiments may vary depending on the number of distributed meters in the network, e.g. eight to twelve brokers, or more or fewer, if there is around 100,000 distributed meters.

Although the discussion of FIGS. 6A and 6B referred to communication between a meter and a broker and/or among meters, in order to clarify that such communication does not occur for traditional meters, communication will be referred to herein below as being with a meter agent(s) controller.

Figure 7:
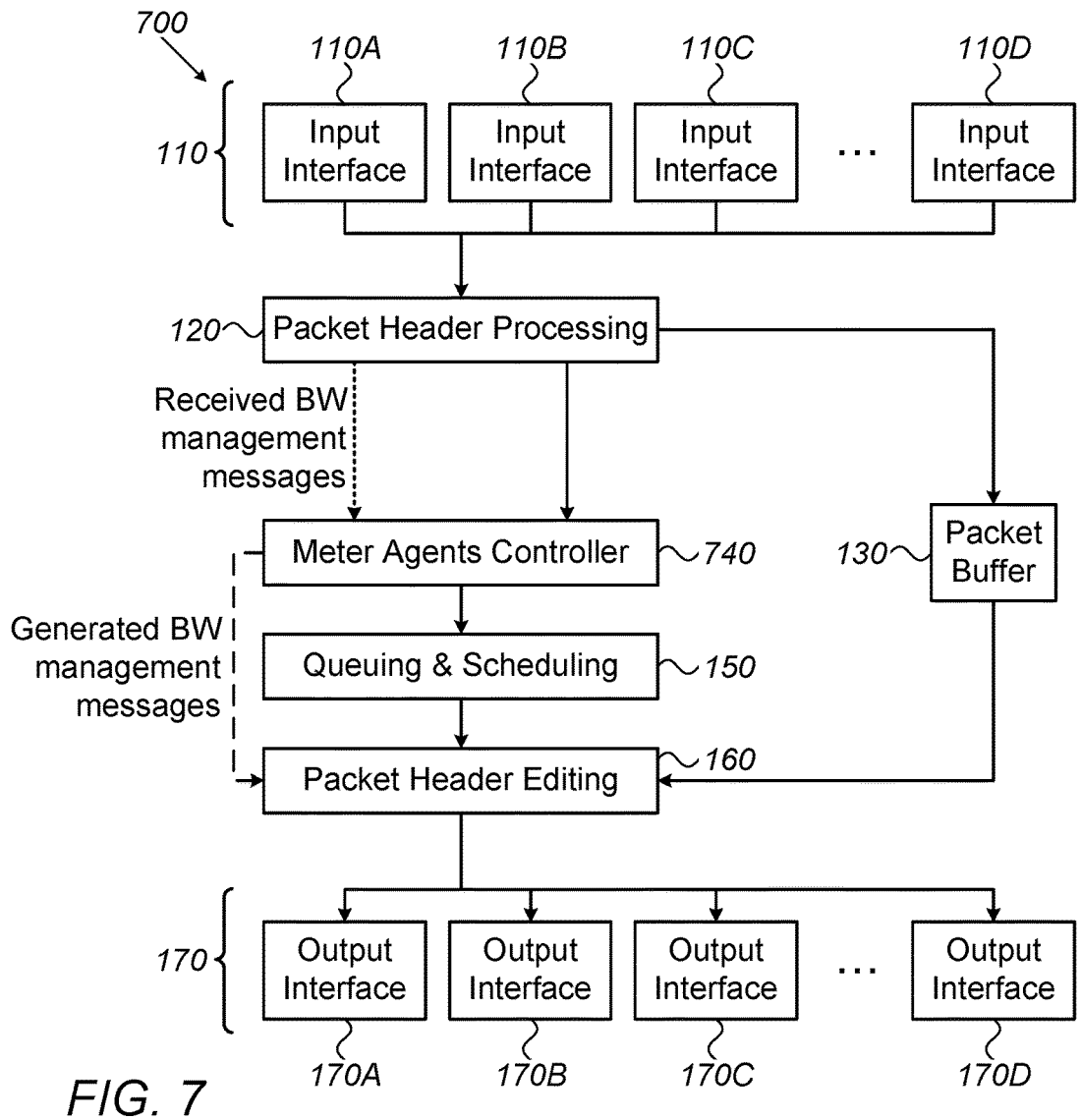
FIG. 7 is a block diagram of a switch that includes one or more meters, in accordance with some embodiments of the presently disclosed subject matter.

Refer to FIG. 7 which is a block diagram of a switch 700 that includes one or more meters, in accordance with some embodiments of the presently disclosed subject matter.

The description of FIG. 7 will focus on the differences between switch 700 and switch 100 of FIG. 1. Switch 700 may include a meter agent(s) controller 740 that as part of the management (or in other words control) of performance of tasks relating to one or more meter(s), also referred to herein as control or management of meter(s), may be adapted to manage allocated bandwidth(s) for the meter(s). The managed (or in other words controlled) meter(s), or a subgroup of the managed meters, may be associated with one or more distributed meters. For instance, each managed meter, each set of managed meters, each managed meter in the subgroup, or each set of managed meters in the subgroup may be associated with a different distributed meter. In order to manage allocated bandwidth, meter agent(s) controller 740 may be adapted to detect bandwidth discrepancies, adjust (e.g. decrease/release, increase) allocated bandwidth, parse received bandwidth management messages and/or generate bandwidth management messages, etc.

A bandwidth management message may be received by switch 700 via any of input interface(s) 110. However, if =the message is from within the same silicon, the message may or may not be received via input interface 110. Received bandwidth management messages may have been sent by bandwidth broker(s) and/or other meter agent(s) controller(s). Depending on the embodiment, meter agent(s) controller 740 may or may not always receive bandwidth management messages from the same bandwidth broker or from the same other meter agent(s) controller. Bandwidth management message(s) may be encapsulated in a packet that is received by switch 700. Packet header processing 120 may be adapted to forward received bandwidth management messages to meter agent(s) controller 740. Meter agent(s) controller 740 may be adapted to decapsulate received bandwidth management messages, if such messages were encapsulated in packets. Meter agent(s) controller 740 may be adapted to parse received bandwidth management messages, and act in accordance with the received messages, as will be described in more detail below with reference to FIG. 11. For packets received that exclude bandwidth management messages, the packets may be processed by switch 700 as described above with reference to switch 100 of FIG. 1.

Meter agent(s) controller 740 may be adapted to generate bandwidth management messages. Generated bandwidth management messages may optionally be encapsulated in packets. Generated bandwidth management messages may wait in queueing and scheduling 150, until it is the turn of the messages to be transmitted. Alternatively, the generated bandwidth management messages may not wait in queueing and scheduling 150. Optionally, packet header editing 160 is adapted to edit the bandwidth management messages. Any of output interface(s) 170 may be adapted to transmit generated bandwidth management messages. However, if the destination of a generated bandwidth management message is within the same silicon, the message may or may not be transmitted via output interface 170. Bandwidth management messages may be sent to bandwidth broker, and/or to other meter agent(s) controller(s) by meter agent(s) controller 740. Depending on the embodiment, meter agent(s) controller 740 may or may not always send messages to the same bandwidth broker or to the same other meter agent(s) controller. The term message, as used herein, should be construed broadly as any appropriate indication of information which enables the receiver of the message (e.g. a bandwidth broker, meter agent(s) controller 740, or another meter agent(s) controller) to determine the information. The terms "send", "receive" and "forward" are used herein to connote any transfer of a message, whether via a network, within the same node, within the same silicon, and/or via a local connection. A particular message may be transferred between any two meter agent(s) controllers, between any two brokers, or between a meter agent(s) controller and a broker.

In contrast to meter agent(s) controller 140 of FIG. 1, the managed meter(s), managed by meter agent(s) controller 740 may include statistical meter(s) and/or deterministic meter(s), depending on the embodiment. Deterministic meters are meter(s) where memory is updated for one packet per write access, whereas statistical meters were discussed above. Meter agent(s) controller 740 may therefore not necessarily be adapted to control the timing for updating the value of a meter to reflect the measurement of the data bandwidth. Meter agent(s) controller 740 may therefore include meter(s), module(s) for managing allocated bandwidth(s) of meter(s), module(s) for controlling the performance of other task(s) relating to meter(s), and/or module(s) for performing other tasks, depending on the embodiment. For example, the module(s) for performing other task(s) may include module(s) for marking packets.

A node that is not a switch may include meter agent(s) controller 740, one or more of the other module(s) shown in FIG. 7 as appropriate, and/or any other module(s) as appropriate.

Figure 8:
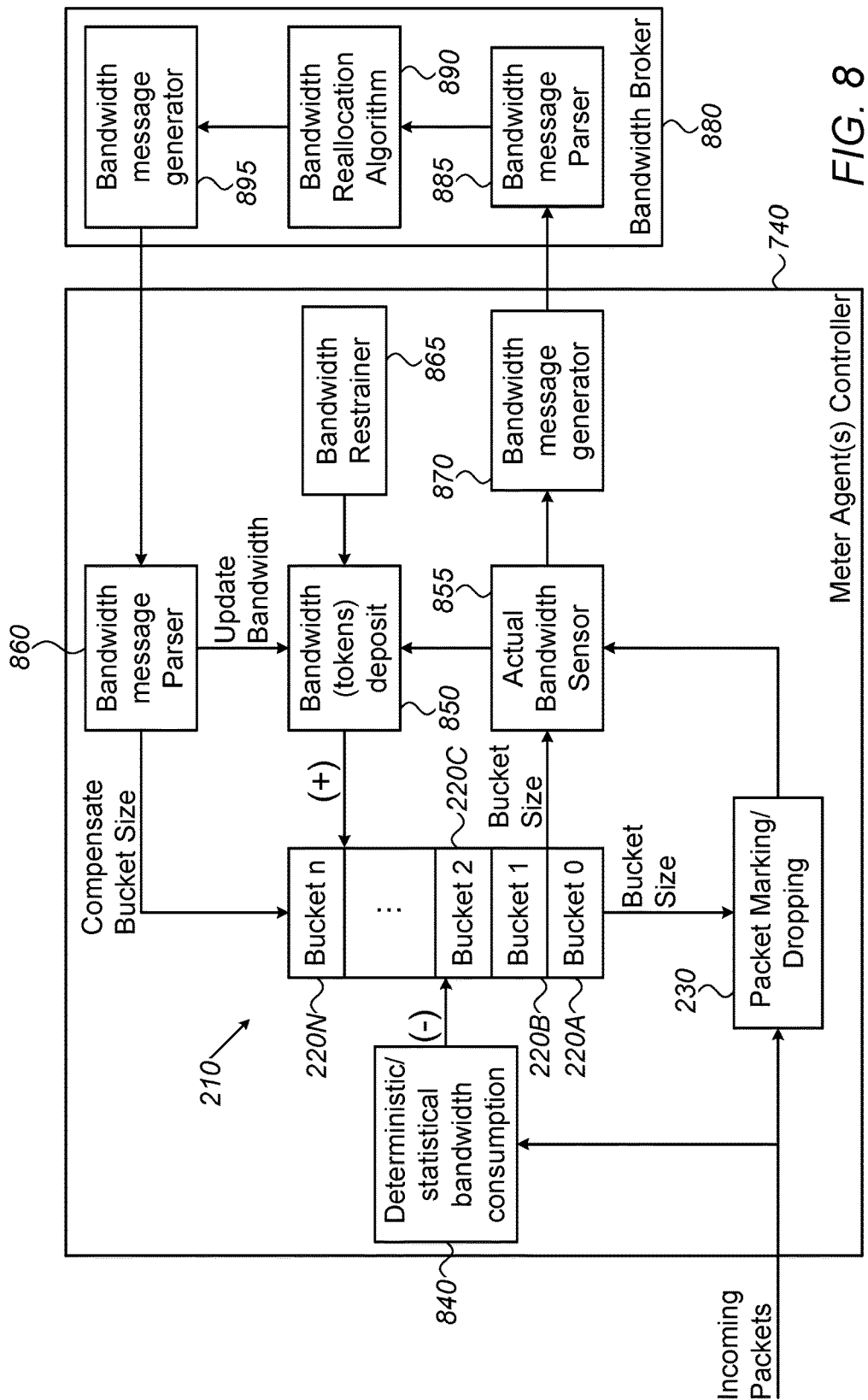
FIG. 8 illustrates a distributed meter architecture, in accordance with some embodiments of the presently disclosed subject matter.

Reference is now made to FIG. 8 which illustrates a distributed meter architecture, in accordance with some embodiments of the presently disclosed subject matter.

In FIG. 8, meter agent(s) controller 740 may include memory 210. Memory 210 may comprise one or more memory entry/ies 220 associated with one or more meters as discussed above with reference to FIG. 2. The type of memory 210 may vary depending on the embodiment, as discussed above with reference to FIG. 2. Packet marking/dropping 230 may mark non-conforming packets with a high drop or intermediate drop precedence. (The description does not differentiate between marking with a drop precedence performed by meter agent(s) controller 740, and indicating by meter agent(s) controller 740 which leads to later marking. Both actual marking and the indicating that the packet should be marked, will be referred to herein as marking by the meter agent(s) controller 140). Statistical and/or deterministic bandwidth consumption 840 (also referred to herein as "consumer") may perform statistical updating of memory entries 220, as discussed above with reference to FIG. 2, and/or may perform deterministic updating of memory entries 220 where the updating may be for one packet per write access. For instance, in deterministic updating, the value(s) of a given entry 220 may be reduced for one packet at a time, in contrast to statistical updating where the value(s) may be reduced for a plurality of packets at a time.

One or more of the meters managed by meter agent(s) controller 740 may be part of a certain distributed meter, or in other words, part of a plurality of meters sharing a total allocated bandwidth. Each of the managed meter(s) that is part of the distributed meter may have an allocated bandwidth that is a portion of the total allocated bandwidth. Reference is now made in the remainder of the description of FIG. 8 of meter agent(s) controller 740, to any particular meter of such managed meter(s) that is part of the distributed meter.

Meter agent(s) controller 740 may include an actual bandwidth sensor 855 (also referred to herein as "bandwidth sensor" or "sensor") adapted to detect, for any particular meter, if there is a discrepancy between the data bandwidth measured by the meter and the allocated bandwidth for the meter. For example, bandwidth sensor 855 may detect that in accordance with at least one criterion the allocated bandwidth for a meter is excessive compared to the data bandwidth, or the allocated bandwidth is insufficient compared to the data bandwidth. The timing of the detecting may vary depending on the embodiment. For example, the detecting may occur periodically, independently of any event. In another example, the detecting for a meter may additionally or alternatively occur dependent on an event, such as each time memory entry/ies 220 associated with a meter is read from, each time memory entry/ies 220 associated with the meter is written to, each time memory entry/ies 220 associated with the meter is written to under certain circumstances, and/or each time memory entry/ies 220 associated with the meter is supposed to be written to. In some cases, the value(s) (e.g. representative of the accumulated surplus of past allocated bandwidth over past data bandwidth) of memory entry/ies 220 associated with the meter may be indicative of whether or not there is a discrepancy between the data bandwidth measured by the meter and the allocated bandwidth. Therefore each time memory entry/ies 220 associated with the meter is read from, each time memory entry/ies 220 associated with the meter is written to, each time memory entry/ies 220 associated with the meter is written to under certain circumstances, and/or each time memory entry/ies 220 associated with the meter is supposed to be written to, it may be desirable to detect the value(s) of memory entry/ies 220 associated with the meter. In other cases, the detecting of a discrepancy may additionally or alternatively include detecting that is related to the operation of packet marking/dropping 230.

In some embodiments the detecting may include detecting a severity grade (to be discussed below), e.g. each time a packet is processed by meter agent(s) controller 740, in order to determine if there is insufficient allocated bandwidth. Additionally or alternatively, in some embodiments which assume a token bucket(s) implementation for the meter, the detecting may include detecting the value(s) of memory entry/ies 220 associated with the meter each time token addition occurs, or does not occur due to the bucket(s) being full, in order to determine if there is excessive allocated bandwidth.

Assuming a token bucket(s) implementation, meter agent(s) controller 740 may include a bandwidth (tokens) deposit 850 (also referred to herein as "depositor" or "bandwidth deposit"). Bandwidth deposit 850 may be adapted to maintain the depositing of tokens as before, or adjust the depositing of tokens when necessary. The adjustment may be in response to any appropriate occurrence such as received bandwidth management messages, in response to detected discrepancies, in response to (suspected) losses in bandwidth management messages, etc.

Meter agent(s) controller 740 may include a bandwidth message parser 860 (also referred to herein as "parser"). Bandwidth message parser 860 may be adapted to parse received bandwidth management messages indicative of updated allocated bandwidths. For example a received bandwidth management message may be indicative of an updated allocated bandwidth by indicating a granted/released allocation of bandwidth (positive and/or negative granted, where negative means that bandwidth is taken away); and/or by being indicative of network latency, such as a delay between the time that bandwidth was granted/released (by bandwidth broker or another meter agent(s) controller) and the time of adjustment by meter agent(s) controller 740. Network latency, for instance, may cause temporary bandwidth loss or gain due to the time the granted/released bandwidth message spent in the network, thus not adding or subtracting bytes during such time to destination meter(s). Bandwidth message parser 860 may be further adapted to decapsulate received bandwidth management messages, if such messages were encapsulated in packets.

An updated allocated bandwidth for a meter, or a release of at least part of an allocated bandwidth from the meter (e.g. after detection by bandwidth sensor 855 that allocated bandwidth is excessive) may be implemented by meter agent(s) controller 740 in various ways, depending on the embodiment. For example, an accumulated surplus of past allocated bandwidth over past data bandwidth (referred to herein as "accumulated surplus") may be updated (e.g. increased or decreased). The accumulated surplus is the past allocated bandwidth that was not used up by the past data bandwidth. Therefore increasing or decreasing the accumulated surplus, may be considered as increasing or decreasing the past allocated bandwidth retroactively.

As another example, additionally or alternatively, implementation of an updated allocated bandwidth for a meter, or of a release of at least part of an allocated bandwidth (e.g. after detection that allocated bandwidth is excessive) from the meter, may affect a subsequent allocated bandwidth for the meter. Continuing with this example with reference to implementing the updated allocated bandwidth, the updated allocated bandwidth, or an allocated bandwidth that is a function of the updated allocated bandwidth and the change in the accumulated surplus due to the updating, may be substituted as the subsequent allocated bandwidth. Similarly, continuing with this example but with reference to the release of at least part of the allocated bandwidth, the subsequent allocated bandwidth may be less than the allocated bandwidth. In this example, ignoring any accumulated surplus, the data bandwidth that is measured after the implementation of the updated allocated bandwidth or the release of the at least part of the allocated bandwidth, may be compared to the subsequent allocated bandwidth.

In some embodiments, implementation of an updated allocated bandwidth for a meter or a release of at least part of the allocated bandwidth from the meter may include bandwidth deposit 850 adjusting the depositing of tokens, thereby affecting the subsequent allocated bandwidth. Adjustment may be based on granted/released allocations of bandwidth (positive and/or negative granted, where negative means that bandwidth is taken away), and/or to take into account network latency, such as a delay between the time that bandwidth was granted/released (by a bandwidth broker or another meter agent(s) controller) and the time of adjustment by meter agent(s) controller 740.

Adjustment of the depositing of tokens may be performed in any appropriate manner. For example, it may be assumed that memory entry/ies 220 associated with a meter have token bucket(s) and that bandwidth deposit 850 adds tokens of data units in accordance with a token rate of the meter to the token bucket(s). The fill rate may be defined as the product of the token rate and the token size (e.g. quantity of data units such as bits per token). Adjustment of the depositing of tokens for a meter may include increasing or decreasing the token rate and/or increasing or decreasing the size of the token.

In some other embodiments, implementation of an updated allocated bandwidth to compensate for granted/released allocations of bandwidth indicated in received messages and/or for indicative network latency may be additionally or alternatively performed by bandwidth message parser 860, which may adjust, when appropriate, an accumulated surplus of past allocated bandwidth over past data bandwidth. Additionally or alternatively, meter agent(s) controller 740 may be adapted to adjust, when appropriate, an accumulated surplus of past allocated bandwidth over past data bandwidth, for a release of the at least part of the allocated bandwidth, e.g. after detection of an excessive allocated bandwidth.

Meter agent(s) controller 740 may include a bandwidth restrainer 865 (also referred to herein as "restrainer"). Bandwidth restrainer 865 may be adapted to cause a (current) allocated bandwidth for a meter to be adjusted toward a nominal bandwidth for the meter. For example, bandwidth restrainer 865 may be adapted to periodically (e.g. every millisecond) compare the current allocated bandwidth to the nominal bandwidth, and if the current allocated bandwidth is not equivalent to the nominal bandwidth, cause the current allocated bandwidth allocation to be adjusted towards the nominal bandwidth. For example, the nominal bandwidth may be the initial bandwidth allocated to the meter. A current allocated bandwidth may be adjusted for instance, by adjusting one or more of the following: a quantity of data units (e.g. bits) per token towards a nominal quantity; or a token rate towards a nominal token rate. Additionally or alternatively, a current allocated bandwidths may be adjusted by adjusting the accumulated surplus of past allocated bandwidth over past data bandwidth. Bandwidth restrainer 865 may be adapted to adjust the current bandwidth allocations toward the nominal bandwidths, for instance slowly, so that bandwidth change is done in small steps, thus practically resetting the distributed meter once in a long period of time. Bandwidth restrainer 865 may be adapted to perform the adjustment in a side process that may not be affected by and/or may not affect other processes performed by meter agent(s) controller 740.

For example, initially, all meters in a distributed meter may have an allocated bandwidth ("initial bandwidth") that is an equal share of a total allocated bandwidth (e.g. global customer data rate specified in an SLA), e.g. with all meters associated with the same token size. Over a cycle, the allocated bandwidths of the various meters in the distributed meter may vary from the initial bandwidths, but may be restrained to within a certain range from the initial bandwidths. Adjustment toward the initial bandwidths by bandwidth restrainers such as bandwidth restrainer 865 may in some cases offset (suspected) lost bandwidth management messages that released or granted bandwidth, such as messages that may have been lost between the sender of the messages (e.g. meter agent(s) controller 740, bandwidth broker 880, another meter agent(s) controller, another broker, etc.) and the receiver of the messages (e.g. bandwidth broker 880, meter agent(s) controller 740, another meter agent(s) controller, another broker, etc.). For example, losses in bandwidth management messages (e.g. packet losses, if the messages are encapsulated in packets), may imply permanent bandwidth loss for the distributed meter. In some other embodiments, meter agent(s) controller 740 may not include bandwidth restrainer 865.

In in some of the examples presented above, certain type(s) of adjustment in allocated bandwidths (e.g. toward nominal bandwidths, for released or granted bandwidth) included changing the fill rate (e.g. by changing the token size), whereas other type(s) of adjustment (e.g. to compensate for network latency) included changing the accumulated surplus. However, such a distinction may not be present or may differ in some other examples.

Meter agent(s) controller 740 may further include a bandwidth message generator 870 (also referred to herein as "generator") adapted to generate bandwidth management messages. For example, a generated message may be indicative of at least part of an allocated bandwidth being released, if the allocated bandwidth is excessive, or may be indicative of a request for an allocation of additional bandwidth, if the allocated bandwidth is insufficient. If a generated bandwidth message is to be encapsulated in a packet, generator 870 may be adapted to encapsulate the message.

In FIG. 8, the bandwidth management messages are shown as received by and sent to a bandwidth broker 880. Bandwidth broker 880 may be associated only with one meter of the distributed meter (and therefore with the one meter agent(s) controller controlling this meter), may be associated with the two or more meters of the distributed meter (and therefore with the meter agent(s) controller(s) controlling the two or more meters of the distributed meter), or may be a centralized broker associated with all of the meters in the distributed meter (and therefore with the meter agent(s) controller(s) controlling all of the meters of the distributed meter).

Bandwidth broker 880 may include a bandwidth message parser 885 (also referred to herein as "parser") adapted to parse one or messages that were received. Each message is indicative of one or more of the following: a release of at least part of an allocated bandwidth allocated to a meter of a plurality of meters; or a request that additional bandwidth be allocated to the meter. The plurality of the meters may be the meters included in the distributed meter.

Bandwidth broker 880 may also include a bandwidth reallocation algorithm 890 (also referred to herein as "bandwidth reallocation" or "reallocator") adapted to reallocate at least a portion of a total allocated bandwidth, allocated to the plurality of meters, to at least a subset of the plurality of meters. For example, the reallocation may include any reallocation that will discussed below in the introduction to FIG. 13 with and/or the description of FIG. 13. As described in more detail below, bandwidth released from meter(s) associated with releasing message(s), may be reallocated to meter(s) associated with requesting message(s). If the requesting message(s) included severity grade(s), bandwidth reallocation 890 may be adapted to reallocate bandwidth, at least partly based on the severity grade(s). Bandwidth broker 880 may also include a bandwidth message generator 895 (also referred to herein as "generator") adapted to generate message(s) for the at least a subset of the plurality of meters. Each generated message is indicative of a respective updated allocated bandwidth for a respective meter. Optionally, bandwidth message generator 895 may be further adapted to encapsulate one or more of the generated message(s) in packet(s).

Although only meter agent(s) controller 740 is shown in FIG. 8 for the distributed meter, in some embodiments a plurality of meter agent(s) controllers may control meters comprised in the distributed meter. For example there may be meter agent(s) controllers at various nodes (e.g. switches), for instance with each of the various meter agent(s) controllers controlling meter(s) comprised in one or more distributed meters. In such an example, meters from a plurality of nodes may act together as a distributed meter. Although only bandwidth broker 880 is shown in FIG. 8 for the distributed meter, in some embodiments there may be a plurality of bandwidth brokers (e.g. at various nodes) for the distributed meter, e.g. dispersed over a network as in FIG. 6B. The other meter agent(s) controller(s) than meter agent(s) controller 740 and/or the other bandwidth broker(s) than bandwidth broker 880 may in some embodiments also include the modules illustrated respectively for meter agent(s) controller 740 and bandwidth broker 880 in FIG. 8. In some embodiments, instead of or in addition to meter agent(s) controller 740 sending and receiving bandwidth management messages to and from bandwidth broker 880 regarding the distributed meter, meter agent(s) controller 740 may send and/or receive bandwidth management message from one or more other meter agent(s) controller(s) (e.g. located at different node(s)) than meter agent(s) controller 740 regarding the distributed meter.

As mentioned above, in some embodiments a change in an allocated bandwidth for a meter that is included in the distributed meter may include changing the fill rate (e.g. changing the token size and/or token rate). It is noted that changing the fill rate may in some cases be more efficient than changing the accumulated surplus of past allocated bandwidth over past data bandwidth, as a change in the fill rate may have a longer term effect than a change in an accumulated surplus. Therefore fewer transactions may be needed, or in other words, fewer bandwidth management messages may need to be sent/received when changes in allocated bandwidths for various meters in the distributed meter include changing respective fill rates rather than changing respective accumulated surpluses. It is further noted that conventionally, the token rates for various meters at a node (e.g. in a switch) may have varied, whereas the token size was an internal configuration setting for the entire node, not configurable by a user, and therefore uniform and constant for all meters at the node. However in some embodiments of the presently disclosed subject matter, different meters at a node may have different token size due to the adjustment of token size.

Meter agent(s) controller 740 may in some embodiments control meter(s) included in one or more other distributed meters than the distributed meter discussed in the description of FIG. 8. Broker 880 may in some embodiments broker for meter(s) included in one or more other distributed meters than the distributed meter discussed in the description of FIG. 8. In such embodiments, the functioning of meter agent(s) controller 740 and broker 880 with respect to the other distributed meter(s), may be analogous to what was discussed in the description of FIG. 8 with respect to the distributed meter.

Figure 9:
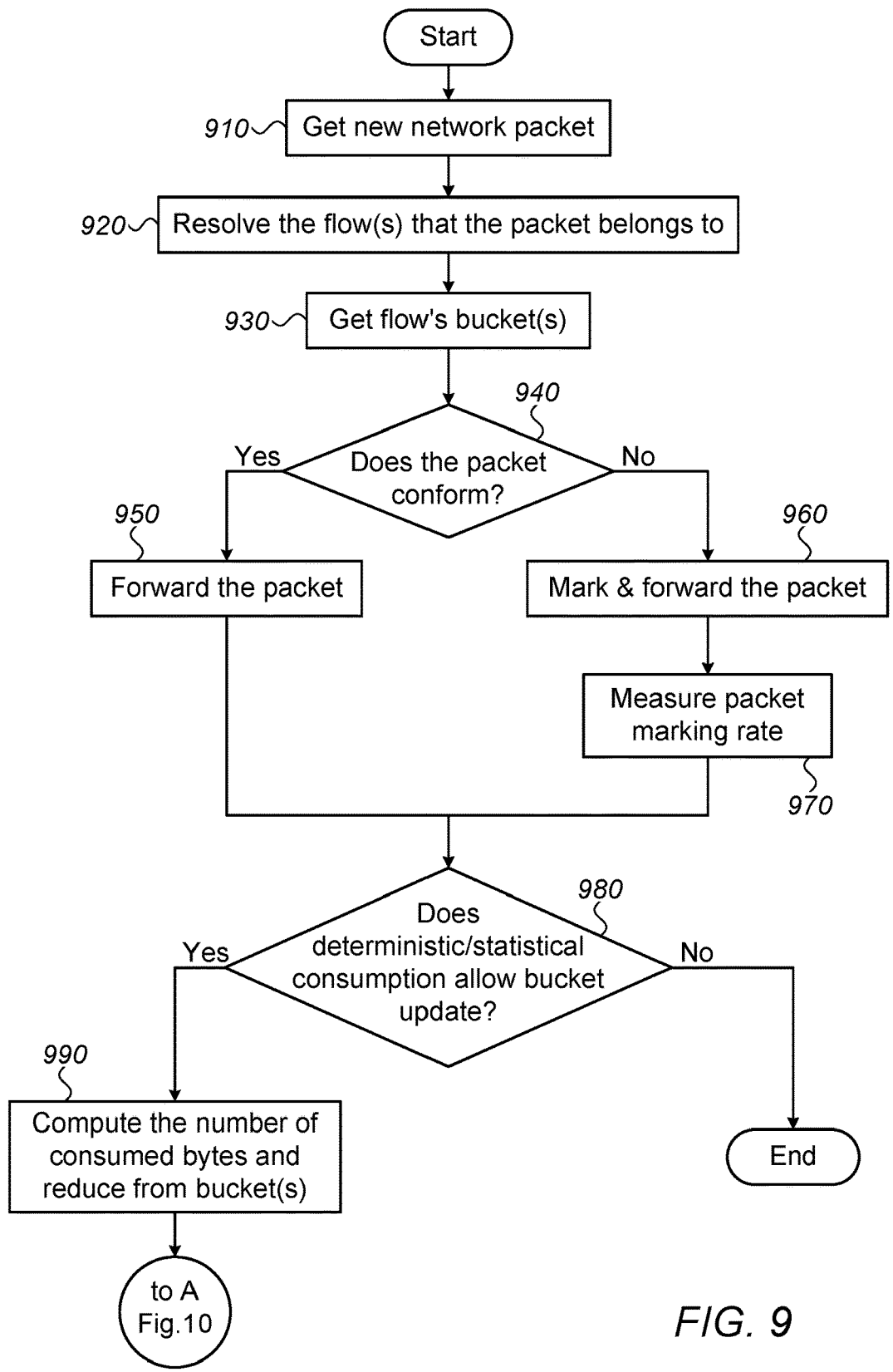
FIG. 9 which is a flowchart of a method of processing a network packet, in accordance with some embodiments of the presently disclosed subject matter.

Refer to FIG. 9 which is a flowchart of a method 900 of processing a network packet, in accordance with some embodiments of the presently disclosed subject matter. It assumed that the stages in method 900 that are performed by a meter agent(s) controller, are performed by meter agent(s) controller 740.

In stage 910, a new network packet may be received. For instance, the packet may be received via an input interface such as any of input interface(s) 110. For instance, the packet may be received via a network, or may be received internally if originating at the same node where method 900 is being performed.

In stage 920, the packet may be resolved (or in other words classified) to flow(s) and therefore to corresponding meter(s). For example, the packet may be classified to a flow based on 5-tuple; may be classified to a flow based on which measured entity is associated with an element from which the packet originated and/or associated with an element to which the packet is destined; etc.

In stage 930, the memory entry/ies (e.g. 220C) associated with the resolved meter is read, e.g. by a meter agent(s) controller such as meter agent(s) controller 740. For example, it may be assumed that the meter includes one or more token bucket(s), as described above.

In stage 940, it may be determined if the packet conforms. Some of such embodiments were described above.

If in stage 940 the packet does conform, then the packet may be forwarded, in stage 950, by an output interface such as any of output interfaces 170. For instance, the packet may be forwarded through the network, provided method 900 is not being performed at the node that is the destination endpoint for the packet. For example, the packet may be forwarded in turn, e.g. after queuing and scheduling of the packets or packets metadata, and/or after packet editing as described above with reference to FIG. 1. Low drop precedence marking/indicating of the conforming packet may occur.

If instead in stage 940, the packet does not conform, then in stage 960 the packet may be marked as high drop/intermediate drop precedence, e.g. by meter agent(s) controller 740. Optionally, a packet severity grade (also referred to herein as a "severity grade") may be calculated, e.g. by bandwidth sensor 855 of meter agent(s) controller 740. In some embodiments, a severity grade may equal a marking rate or may be any appropriate function of a marking rate. A marking rate may refer to the rate of marking packets as high drop precedence, or to the rate of marking packets as either high drop or intermediate drop precedence. In embodiments where a marking rate may be calculated (e.g. in order to calculate the severity grade), the calculation of the marking rate may vary depending on the embodiment. For example, each time a packet is marked as high drop precedence or high drop/intermediate drop precedence, a counter may be increased by a certain amount (e.g. x) and each time a packet is not marked or indicated to be marked as high drop precedence or high drop/intermediate drop precedence (e.g. "yes" to stage 940) the counter may be decreased by a given amount (e.g. y=0.5x). Additionally or alternatively, the marking rate may equal the number of marked packets or the number of marked bytes, meaning the number of bytes in packets that are marked as high drop precedence or as high drop/intermediate drop precedence.

In stage 970, the packet, if not dropped, may be forwarded by an output interface such as any of output interfaces 170. The packet, for instance may be forwarded through the network, provided method 900 is not being performed at the node that is the destination endpoint for the packet. For example, the packet may be forwarded in turn, as described above with reference to FIG. 1, e.g. after queuing and scheduling of the packet or packet metadata and/or packet editing.

In stage 980, it may be determined if memory entry/ies 220C (e.g. bucket(s)) should be updated for a packet that is low drop precedence or low drop/intermediate drop precedence while the packet is being processed. For example, it may be determined that memory entry/ies 220C is to be updated because the meter is deterministic. Alternatively, if the meter is statistical it may be determined that memory entry/ies 220C is to be updated while the current packet or metadata thereof is being processed; e.g. by meter agent(s) controller 740 or more generally by a node including meter agent(s) controller 740. See above description with reference to FIGS. 2 and 3. If the memory entry/ies is to be updated then in stage 990, the number of consumed data units (e.g. bytes) may be reduced from the bucket(s). Consumed bytes may, for instance, take into account the size of the packet, if a meter is a deterministic meter. Additionally or alternatively, if the meter is a statistical meter, the consumed bytes may take into account the size of the packet and the size(s) of other packet(s) for which the memory entry/ies 220C have not yet been updated. Optionally, the updating of the memory entry/ies 220C may trigger an attempt to detect if there is a discrepancy, as will be described below with reference to FIG. 10. Method 900 may then end.

If in stage 980, it is determined that memory entry/ies 220C should not be updated for the packet, then method 900 ends without updating the memory entry/ies 220C. For example, it may be determined that memory entry/ies 220C should not be updated because the packet is high drop precedence or high drop/intermediate drop precedence; and/or because the meter is a statistical meter and is not to be updated while the current packet or metadata thereof is being processed; e.g. by meter agent(s) controller 740 or more generally by a node including meter agent(s) controller 740, as described above with reference to FIGS. 2 and 3.

In some embodiments, an attempt to detect if there is a discrepancy may additionally or alternatively occur independently of updating for consumed data units. For example, the attempt may be triggered each time memory entry/ies 220C are read by meter agent(s) controller 740, or each time the severity grade is updated from a previous value.

Figure 10:
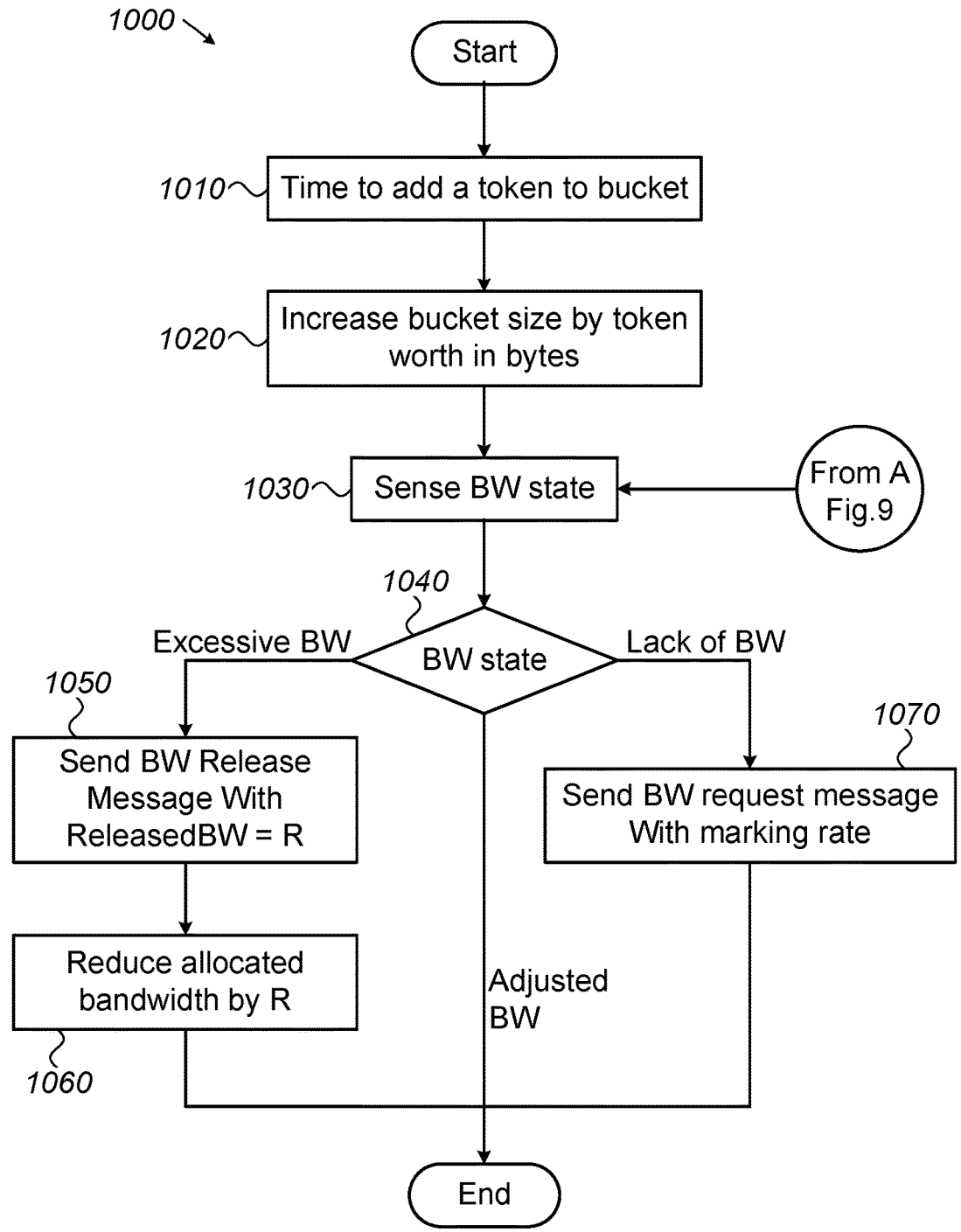
FIG. 10 is a flowchart of a method of generating bandwidth management messages, in accordance with some embodiments of the presently disclosed subject matter.

Reference is now made to FIG. 10 which is a flowchart of a method 1000 of generating bandwidth management messages, in accordance with some embodiments of the presently disclosed subject matter. It is assumed that the stages in method 1000 that are performed by a meter agent(s) controller, are performed by meter agent(s) controller 740.

It is assumed that memory entry/ies (e.g. 220C) associated with a meter is/are token bucket(s). In stage 1010, it may be determined by meter agent(s) controller 740 that it is time to add a token to the token bucket(s), e.g. where it may be determined that it is time based on the token rate of the meter. Alternatively, stage 1010 may be omitted and stage 1020 may occur upon reading memory entry/ies 220C in stage 930 (FIG. 9). In stage 1020, if upon reading memory entry/ies 220C it is determined that token(s) may be added, because the maximum bucket size has not been reached (i.e. token bucket(s) not full), one or more of memory entry/ies 220C associated with the meter may be written to in order to add a token. For example, a token may be added, e.g. to the bucket or to the first of two buckets, thereby increasing the bucket size by the token worth in data units. As discussed above, in some embodiments, only one full token may be added at a time in stage 1020, whereas in some other embodiments, more than one full token and/or partial token(s) may be added at a time in stage 1020. Also as discussed above, the writing to memory entry/ies 220C relating to token addition may or may not be separate from the writing to memory entry/ies 220C relating to packet(s), depending on the embodiment. Otherwise, if the maximum bucket size has been reached, a decision may be made not to write to memory entry/ies 220C.

In stage 1030, after writing to memory entry/ies 220C, after the decision not to write to memory entry/ies 220C in stage 1020, and/or after being triggered by any of the stages of method 900, it may be detected whether or not there is a bandwidth discrepancy in accordance with at least one criterion, for instance by meter agent(s) controller 740.

Alternatively, in some embodiments, bandwidth discrepancy detection may occur in fewer more and/or different situations. For example, bandwidth discrepancy detection may not occur if a token is deposited; or may not occur if a token is not deposited.

The at least one criterion in accordance with which a bandwidth discrepancy is detected may vary depending on the embodiment. It may be understood that depending on how the at least one criterion is implemented, a certain discrepancy may or may not be considered to be indicative of excessive or insufficient allocated bandwidth. Some examples of implementations are now described. For example, a bandwidth discrepancy in accordance with at least one criterion may be detected for a meter based on comparing the accumulated surplus of past allocated bandwidth over past data bandwidth (e.g. represented by the value(s) of the bucket(s) corresponding to the meter) to one or more threshold(s)/floor(s). Continuing with the example, the at least one criterion may include the accumulated surplus being below a certain floor or above a given threshold (set higher than the floor). As another example, a bandwidth discrepancy in accordance with at least one criterion may be additionally or alternatively be detected for a meter based on marked packet(s). Continuing with the example, the at least one criterion may include at least one packet being marked. Additionally or alternatively, a bandwidth discrepancy in accordance with at least one criterion may be detected based on token depositing. Continuing with the example, the at least one criterion may include token(s) not being added, due to the token bucket(s) having reached the full level (or in other words the maximum bucket size), or token(s) being added but the token bucket(s) being above a certain percentage of the full level ("almost full"). As another example, additionally or alternatively, a bandwidth discrepancy in accordance with at least one criterion may be detected based on the severity grade. Continuing with the example, the at least one criterion may include the severity grade (discussed above with reference to stage 960) exceeding a threshold. For instance, the severity grade exceeding a threshold may include the value of the counter with respect to the marking rate; the number of marked packets; and/or the number of marked bytes being above respective threshold(s). For another instance, the severity grade exceeding a threshold may include any appropriate function of the value of the counter with respect to the marking rate; any appropriate function of the number of marked packets; and/or any appropriate function of the number of marked bytes being above respective threshold(s).

As another example, additionally or alternatively, a bandwidth discrepancy in accordance with at least one criterion may be detected based on the rate of a token bucket(s) being full and/or almost full. Continuing with the example, the at least one criterion may include the rate of the bucket(s) being full exceeding certain threshold(s), and/or the rate of the bucket(s) being almost being full exceeding specific threshold(s). The rate of the bucket(s) being full and/or the rate of being almost full when reading the bucket(s) may be computed by using a counter. For instance, every time when reading a bucket(s) that the bucket(s) is full and therefore no token is added, a counter may be increased (e.g. by value i), whereas every time the bucket(s) is not full the counter may be decreased (e.g. by value j=0.5i). Additionally or alternatively, every time when reading a bucket, the bucket(s) is over a certain percentage of full, a counter may be increased (e.g. by value i), whereas every time the bucket(s) is not over a certain percentage of full, the counter may be decreased (e.g. by value j=0.5i). If the value of the counter is above the threshold then a bandwidth discrepancy may be sensed.

If no discrepancy is detected in stage 1040 (in other words, neither excessive bandwidth nor lack of bandwidth), then the allocated bandwidth may remain as before the detecting, e.g. as adjusted bandwidth. Method 1000 in this case ends without sending any message.

If instead a discrepancy is detected in stage 1040, the discrepancy may be due to excessive allocated bandwidth compared to the data bandwidth measured by the meter, or an insufficient (or in other words lack of) allocated bandwidth compared to the data bandwidth measured by the meter, based on at least one criterion. For example, if the accumulated surplus of past allocated bandwidth over past data bandwidth is above a certain threshold; the bucket(s) is full or almost full; and/or the rate of the bucket(s) being full, or almost full, exceeds a specific threshold, then the discrepancy may be due to excessive bandwidth. If the accumulated surplus of past allocated bandwidth over past data bandwidth is below a certain floor, a packet is marked, and/or the severity grade is above a certain threshold, then the discrepancy may be due to insufficient allocated bandwidth.

If there is excessive allocated bandwidth, then the allocated bandwidth for the meter may be reduced, (e.g. by reducing the accumulated surplus, the token rate, and/or the size of the token). Depending on the embodiment, the entire allocated bandwidth for the meter may be released from the meter, and the allocated bandwidth may therefore be reduced to zero; or only a part of the entire allocated bandwidth may be released from the meter, and the allocated bandwidth may be reduced to a value above zero. In stage 1050, a bandwidth release message may be generated, by meter agent(s) controller 740 and sent, e.g. by an output interface such as any of output interface(s) 170, optionally after being queued and scheduled and/or edited. The bandwidth release message may be indicative of at least part of the allocated bandwidth being released from the meter, and may enable the at least part of the allocated bandwidth, or a portion thereof, to be reallocated to one or more meters in a plurality of meters In stage 1060, the allocated bandwidth may be reduced by the released bandwidth, e.g. by a meter agent(s) controller such as meter agent(s) controller 740. Method 1000 then ends. It is noted that if the released bandwidth is large, (e.g. the entire allocated bandwidth), it may be possible that in the next iteration a discrepancy may be sensed that may lead to a request for an allocation of additional bandwidth (and potentially the reallocation to the meter of bandwidth previously released from the meter).

If there is insufficient (or in other words, a lack of) allocated bandwidth detected in stage 1040, then in stage 1070, a bandwidth request management message may be generated by meter agent(s) controller 740. The bandwidth request management message may be indicative of a request for an allocation of additional bandwidth to the meter. The severity of bandwidth shortage may or may not be indicated by the message. For example, the severity of bandwidth shortage may be indicated by the message including the last computed severity grade. The bandwidth management message may be sent, e.g. by an output interface such as any of output interface(s) 170, optionally after being queued and scheduled and/or edited. Method 1000 then ends.

Optionally, generated bandwidth management messages (e.g. release and/or request) are sent in packets. For example bandwidth management messages for various meters controlled by e.g. meter agent(s) controller 740 may be packed into packet(s), and the packet(s) may be time-stamped by the meter agent(s) controller (in addition to or instead of time stamps associated with the messages). Packet(s) may be sent via the network by any output interface(s) such as any of output interface(s) 170, optionally after being queued and scheduled and/or edited. A generated bandwidth management message, whether in a packet or not, may be sent to a bandwidth broker or to another meter agent(s) controller, depending on the embodiment. A generated bandwidth message that is sent within the same silicon may not need to be sent via an output interface. In such a case or in the case that the generated message is otherwise sent within the node or via a local connection, the receiver of the message (e.g. bandwidth broker) may encapsulate the message in a packet if and when the receiver later forwards the message via the network.

Figure 11:
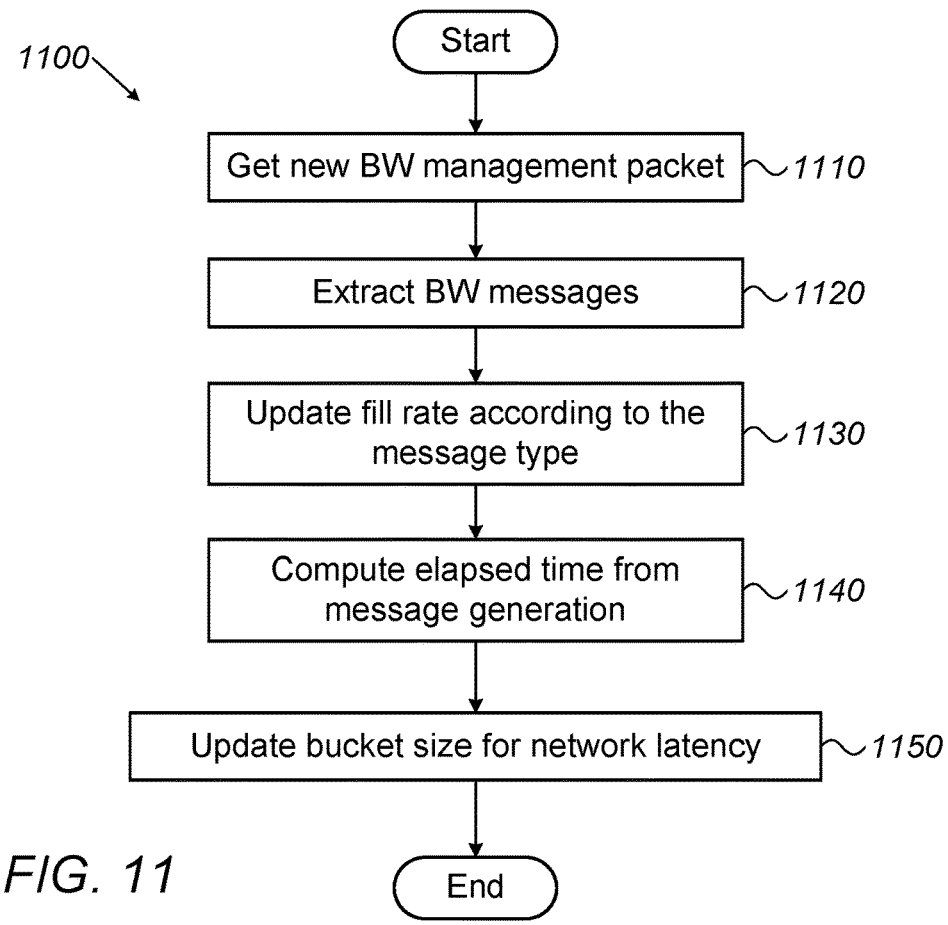
FIG. 11 is a flowchart of a method of processing received bandwidth management messages, in accordance with some embodiments of the presently disclosed subject matter.

FIG. 11 is a flowchart of a method 1100 of processing received bandwidth management messages, in accordance with some embodiments of the presently disclosed subject matter. It is assumed that the stages in method 1100 that are performed by a meter agent(s) controller, are performed by meter agent(s) controller 740.

In stage 1110, meter agent(s) controller 740 may obtain bandwidth management message(s), e.g. from packet header processing 120. For example, bandwidth management message(s) may have been received by way of an input interface, e.g. by way of any of input interface(s) 110 (although not necessarily by way of an input interface, if received within the same silicon). The bandwidth management message(s) may be passed to a meter agent(s) controller 740, e.g. from the input interface, via packet header processing. The received bandwidth management message(s) may be from a bandwidth broker or from another meter agent(s) controller.

In stage 1120, the meter agent(s) controller 740 may optionally extract the bandwidth management message(s), e.g. if the message(s) was/were encapsulated in a packet. Meter agent(s) controller 740 may parse the bandwidth management message(s). Referring to a single parsed message, for the sake of example, and assuming the message is received from a bandwidth broker, the message may be, what is termed herein, a "grant" message, stating granted bandwidth. In stage 1130, the allocated bandwidth for the meter may be updated for the granted bandwidth depending on the message type, where the type here refers to whether the granted bandwidth is positive or negative. If the granted bandwidth is negative then the allocated bandwidth may be reduced, e.g. by reducing the token rate, token size, and/or the accumulated surplus. If the granted bandwidth is positive, then the allocated bandwidth may be increased, e.g. by increasing the token rate, token size, and/or accumulated surplus. In some cases where the granted bandwidth is positive, the granted bandwidth may represent a reallocation of bandwidth previously released by other meter(s).

In the embodiment illustrated in FIG. 11, the token rate and/or token size may be decreased or increased when bandwidth is granted, and therefore in stage 1130, the token rate and/or token size (referred to in the FIG. 11 as the fill rate) may be decreased or increased.

In stage 1140, the elapsed time since message generation (or packet generation) may be calculated by meter agent(s) controller 740, depending on whether the message or packet is time stamped. For example, the message may include a time stamp of message generation or the packet may include a time stamp of packet encapsulation, either of which may be assumed to be approximately the time the bandwidth was granted by the sender, i.e. the bandwidth broker which sent the message. In such an example, the calculated elapsed time may be indicative of network latency from time of message generation or packet encapsulation by the sender (and/or time of generation of the message and/or packet) until time of adjustment by the meter agent(s) controller 740. In some cases of such an example, where the grant is positive, the sender may have adjusted the granted bandwidth to take into account any network latency between the time of release of bandwidth (e.g. as time stamped in release message(s) to the sending broker by the releasing meter agent(s) controller(s)) until the time of generation of the message and/or packet.

In stage 1150, meter agent(s) controller 740 may update the allocated bandwidth for network latency. The allocated bandwidth may be updated, for example, by reducing or increasing the accumulated surplus. In the embodiment illustrated in FIG. 11, the accumulated surplus may be increased for network latency based on the calculated elapsed time if the message is a positive grant message, or the accumulated surplus may be decreased for network latency based on the calculated elapsed time if the message is a negative grant message.

In embodiments, where a message may be received from another meter agent(s) controller, then the message may be a release message stating released bandwidth, or a request message requesting bandwidth.

In the case of a release message, the allocated bandwidth may be increased by meter agent(s) controller as described above for the positive grant message with reference to stages 1130 to 1150, where in this case the released bandwidth may be reallocated to the meter. In this case, the time stamp may be the time stamp the release message/packet was generated/encapsulated and the sender may be the other meter agent(s) controller. Alternatively, meter agent(s) controller 740 may return the message or forward the message to another meter agent(s) controller as will be discussed in more detail in the introduction to the description of FIG. 13 below.

In the case of a request, meter agent(s) controller 740 may respond positively to the request with a release message, as described above with reference to stages 1050 and 1060, may return the request message, may forward the request message to another meter agent(s) controller, or may not act on the message. More details are discussed below in the introduction to FIG. 13.

Due to the granted bandwidth (by a broker) or released bandwidth (by another meter agent(s) controller) indicated in the received message, and the time stamp indicated in the received message or in the packet encapsulating the message, the message may be considered to be indicative of an updated allocated bandwidth, as described above with reference to FIG. 8. When the allocated bandwidth is increased or decreased as described in method 1100, the updated allocated bandwidth may result.

Figure 12:
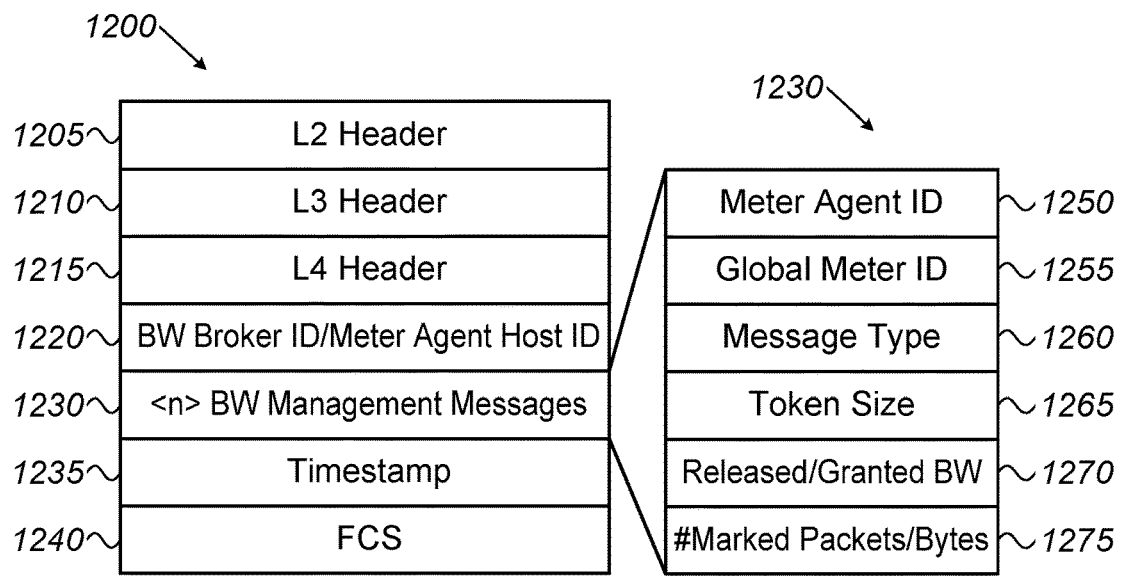
FIG. 12 illustrates a format of a bandwidth management packet, in accordance with some embodiments of the presently disclosed subject matter.

Bandwidth management messages that may be sent and/or received by a meter agent(s) controller such as meter agent(s) controller 740; and/or that may be sent and/or received by a bandwidth broker such as bandwidth broker 880, may vary depending on the embodiment. However for the sake of further illustration, an example will now be provided. FIG. 12 illustrates a format of a bandwidth management packet 1200, in accordance with some embodiments of the presently disclosed subject matter.

Packet 1200 may hold one or more bandwidth management messages, and a time-stamp (e.g. of the generation time of the message and/or packet). For example, the time stamp may either be shared among all the message(s) in packet 1200, or may be stamped per message. In FIG. 12, for illustration purposes the time stamp is shown as being per packet. Message(s) in packet 1200 may be for releasing bandwidth, requesting bandwidth, and/or granting bandwidth.

In some embodiments, when a broker or meter agent(s) controller has generated a certain number of message(s) (e.g. 8, or more or fewer) for a given meter agent(s) controller or broker, and/or when a timer that may have been loaded when generating a first message has expired, the message(s) may be encapsulated in a packet. If message(s) are encapsulated in a packet, the number of message(s) that may be encapsulated in a packet may vary depending on the embodiment. The message(s) may not necessarily all relate to the same meter, and may possibly relate to different meters controlled by a meter agent(s) controller. The different controlled meters, for example may belong to the same distributed meter and/or to different distributed meters.

As shown in FIG. 12, L2 header 1205, L3 header 1210 and L4 header 1215 may be headers used for forwarding packet 1200 in a network. Bandwidth broker ID or meter agent(s) host identifier 1220 may identify the bandwidth broker or meter agent(s) controller that is the sender of the packet. Generated bandwidth management message(s) (e.g. n bandwidth management message(s)) 1230 may be included in packet 1200. A time stamp 1235 shared among the message(s) may be included. Additionally or alternatively, the message(s) may include individual timestamps thereof. Frame check sequence ("FCS") 1240 may be an error detecting code.

In some embodiments, each bandwidth management message 1230 may include a format shown in FIG. 12. As shown in FIG. 12, bandwidth management message 1230 may include a meter agent identifier 1250, which may identify the meter regarding which the message pertains (e.g. the meter releasing bandwidth to a broker, the meter requesting bandwidth, the meter being granted bandwidth, the meter to which bandwidth is being released by another meter, etc.). Bandwidth management message 1230 may include a global meter identifier 1255, identifying the distributed meter associated with the meter to which the message pertains. Alternatively, bandwidth management message 1230 may include only one of identifier 1250 or 1255, e.g., if the identity of the other may be determined based on the identity of the one in message 1230. Message type 1260 may indicate the message type for the bandwidth management message, where here message type may refer to whether message 1230 is a bandwidth release message, bandwidth grant message, or bandwidth request message. If adjustment to bandwidth for bandwidth grant or release is to be performed by way of changing token size, then message 1230 may include token size 1265. If message 1230 is a release message or a grant message, message 1230 may also include the granted or released bandwidth 1270, e.g. the percentage to be granted or released of the token size stated in the message, where a negative percentage may be used if the granted bandwidth is negative. For example if the token size 1256 is stated as x (bits) and bandwidth 1270 is stated as −y (%) in a grant message, then the token size of the identified meter may be reduced by the product of −y and x.

If message 1230 is a request message, then the severity of the shortage may be indicated in field 1275. For instance, the computed severity grade may be included. The severity grade may be computed, e.g. as described above with reference to method 900. In the embodiment illustrated in FIG. 12 the severity grade is shown as the number of marked packets or number of marked bytes. In some other examples of a request message, the severity of the shortage may not be indicated and field 1275 may be omitted.

Packets and messages are not limited by the formats shown in FIG. 12, and the formats of the bandwidth management messages, and of packets (if the messages are encapsulated in packets) may vary depending on the embodiment. For example, in some embodiments, messages may not be encapsulated if the sender and receiver of the message(s) are at the same node, or locally connected.

As mentioned above, a distributed meter may include a plurality of meters (e.g. at one or more nodes) sharing a total allocated bandwidth, and may optionally also include one or more bandwidth brokers. Although bandwidth management messages may be sent and received by meter agent(s) controllers which control meters belonging to various distributed meters, the following introduction and description of FIG. 13 will now describe bandwidth management messages relating to a single distributed meter and therefore reference will be made to meter agent(s) controller(s) that control meters (included in the distributed meter) sending and receiving the messages. A meter agent(s) controller may send and/or receive bandwidth management messages for meter(s) in the distributed meter that is controlled by meter agent(s) controller 740. Such messages may be received and/or may have been sent by a centralized bandwidth broker, dispersed bandwidth broker(s), and/or other meter agent(s) controller(s).

In cases of messages sent by, say, meter agent(s) controller 740 to another meter agent(s) controller, meter agent(s) controller 740 may be adapted to send any release or request message with respect to a particular meter in the distributed meter that is controlled by meter agent(s) controller 740 to the same meter agent(s) controller with reference to a specific other meter in the distributed meter controlled by the same receiving agent(s) controller. Additionally or alternatively, meter agent(s) controller 740 may be adapted to send such a message to a meter agent(s) controller with reference to a randomly selected other meter in the distributed meter controlled by the receiving meter agent(s) controller. Additionally or alternatively meter agent(s) controller 740 may be adapted to send such a message to a meter agent(s) controller with reference to another meter in the distributed meter selected based on previous interactions. For example, if a second meter agent(s) controller with respect to a second meter has previously released bandwidth (in response to a request message); has sent a release bandwidth message to meter agent(s) controller 740 with reference to the particular meter (e.g. without being requested), or has acted in such a way at a frequency above a certain threshold, then meter agent(s) controller 740 may be adapted to send a new request message with respect to the particular meter to the second meter agent(s) controller with reference to the second meter. However, if the second meter agent(s) controller with respect to the second meter has previously sent a request for an allocation of additional bandwidth to meter agent(s) controller 740 with reference to the particular meter, has not sent a release bandwidth message in response to a request, or has acted in such a way at a frequency above a certain threshold, then meter agent(s) controller 740 with respect to particular first meter may be adapted to not send a new request message to the second meter agent(s) controller with reference to the second meter, but to send a new release bandwidth message to the second meter agent(s) controller with reference to the second meter. In another example, meter agent(s) controller 740 may filter out all meters for which a certain type of message (e.g. request or release) was previously received by meter agent(s) controller 740, randomly select a meter which has not sent this type of message, and send the next message of this type to the meter agent(s) controller controlling the randomly selected meter.

In some embodiments, meter agent(s) controller 740 which receives a release message with reference to a particular meter in the distributed meter that is controlled by meter agent(s) controller 740 may be adapted to use the released bandwidth with regard to the particular meter regardless of whether or not there is a discrepancy in allocated bandwidth for the meter. The released bandwidth may thereby be reallocated to the particular meter. In some other embodiments, meter agent(s) controller 740 which receives a release bandwidth management message with reference to the particular meter that is not needed (e.g. due to having a discrepancy of excessive allocated bandwidth in accordance with at least one criterion), may be adapted to forward the bandwidth management message to a meter agent(s) controller with reference to another meter; or may be adapted to return the bandwidth management message to the sending meter agent(s) controller, so that the sending meter agent(s) controller may then transmit the message to a meter agent(s) controller with reference to another meter.

In some embodiments, meter agent(s) controller 740 which receives a request message for allocation of additional bandwidth with reference to a particular meter controlled by the meter agent(s) controller may not release bandwidth with regard to the particular meter unless a discrepancy of excessive bandwidth in accordance with at least one criterion is detected. In some of such embodiments, meter agent(s) controller 740 may be adapted to forward the request to a meter agent(s) controller with reference to another meter; may be adapted to return the bandwidth management message to the sending meter agent(s) controller, so that the sending meter agent(s) controller may then transmit the message to a meter agent(s) controller with reference to another meter; or may be adapted to not act upon receiving the message. In some other embodiments, meter agent(s) controller 740 may be adapted to release bandwidth even if there is no discrepancy of excessive allocated bandwidth in accordance with at least one criterion, e.g., upon request or under certain circumstances such as a high frequency of receiving such requests. In any of these embodiments, meter agent(s) controller 740 may possibly keep track of received release and request messages, and/or the frequency of receiving release messages and/or request messages with respect to various meter(s) controlled by sending meter agent(s) controller(s), if destinations of future message(s) are to be selected based on previous interactions.

If there is an association of one meter in the distributed meter per bandwidth broker, the transmission and receipt of bandwidth management messages may be similar to the case of bandwidth management messages sent between meter agent(s) controllers. The broker (e.g. 880) associated with a particular meter in the distributed meter that is controlled, say, by meter agent(s) controller 740, may receive a request message or a release message from meter agent(s) controller 740 with respect to the particular meter in the distributed meter. The associated broker may be adapted to forward the received request or release message to another broker. In such a case even if the associated broker and meter agent(s) controller 740 are in the same silicon, the request or release message may necessarily be sent out via an output interface to the other broker if the other broker is not also in the same silicon. For example, a broker which received a release message or request message from meter agent(s) controller 740 with respect to the particular meter may be adapted to forward the release message, or the request message, to the same other broker, to a randomly selected other broker, and/or to another broker selected based on past interactions. For example, if a second broker has previously forwarded a release bandwidth message (in response to a forwarded bandwidth request message), forwarded a release bandwidth to the first broker (not in response to a forwarded bandwidth request message), or has acted in such a way at a frequency above a certain threshold, then the first broker (e.g. 880, associated with the particular meter) may be adapted to forward a new request message to the second broker. However, if the second broker has previously forwarded a request for an allocation of additional bandwidth to the first broker or has not forwarded a release bandwidth in response to a forwarded request message, or has acted in such a way at a rate above a particular threshold, then the first broker may be adapted to not forward a new request message to the second broker, but to forward a new release bandwidth message to the second broker. In another example, the first broker may filter out all brokers which previously forwarded a certain type of message (e.g. request or release) to the first broker, randomly select a broker which has not forwarded this type of message, and forward the next message of this type to the randomly selected broker.

In some embodiments, a receiving broker (e.g. 880) associated with the particular meter in the distributed meter controlled by meter agent(s) controller 740, which receives a forwarded release message from another broker may grant the released bandwidth to the particular meter, thereby reallocating the released bandwidth to the particular meter. In some other embodiments, if the receiving broker receives a forwarded release message from another broker that is not needed by the particular meter, the receiving broker may be adapted to forward the bandwidth management message to yet another broker (e.g. same, randomly selected, or selected based on past interactions); or may be adapted to return the bandwidth management message to the sending broker, so that the sending broker may then transmit the message to a different broker. The receiving broker may detect that the released bandwidth is not needed based on release message received by the broker from meter agent(s) controller 740 with respect to the particular meter.

In some embodiments, the receiving broker associated with the particular meter in the distributed meter controlled by meter agent(s) controller 740, which receives a forwarded request message from another broker may not negatively grant bandwidth with respect to the particular meter. In some of such embodiments, the receiving broker may be adapted to forward the request to yet another broker (e.g. same, randomly selected, or selected based on past interactions); may be adapted to return the bandwidth management message to the sending broker, so that the sending broker may then transmit the message to a different broker; or may be adapted to not act upon the message. In some other embodiments, the receiving broker may negatively grant bandwidth, e.g. when receiving such a forwarded request or under certain circumstances such as a high frequency of receiving such forwarded requests. In any of these embodiments, the receiving broker may possibly keep track of received forwarded release and request messages, and/or the frequency of receiving forwarded release messages and/or forwarded request messages from various broker(s), if destination(s) of forwarding of future message(s) are to be selected based on previous interactions.

In cases of dispersed bandwidth brokers where each broker may be associated with two or more meters in the distributed meter controlled by meter agent(s) controller(s), controlling meter agent(s) controller(s) may send bandwidth request and bandwidth release messages to the respective associated broker. Referring now to one of the brokers, an associated broker (e.g. 880) may be associated with two or more meters controlled by meter agent(s) controller(s) (e.g. 740 and possibly other(s)). The associated broker may be adapted to distribute (e.g. in positive grant bandwidth management messages) a positive pool of bandwidth (or in other words excess or extra bandwidth), for instance, to controlling associated meter agent(s) controller(s) that sent bandwidth request message(s) with respect to associated meter(s) of the distributed meter. The associated broker may be adapted to distribute negative grant bandwidth messages to controlling meter agent(s) controller(s) with respect to associated meter(s), for example if there are too many requests for bandwidth with respect to associated meter(s). Additionally or alternatively, if there are too many requests, the broker may be adapted to forward the request message(s) to another broker, e.g. so that the other broker may forward a subsequent release message to the broker. An associated broker which received release message(s) from controlling meter agent(s) controller(s) with respect to associated meter(s) which the broker may not need for granting (e.g. due to the pool being above a threshold) may forward the release message(s) to another broker. For example a particular broker may be adapted to forward request and/or release message(s) with respect to associated meter(s) to the same other broker, to a randomly selected other broker, or to another broker selected based on past interactions. Continuing with the example, if a second broker has previously forwarded a release bandwidth message to the first broker, or has acted in such a way at a frequency above a certain threshold, then the first broker (e.g. 880) may be adapted to forward a new request message to the second broker. However, if the second broker has previously forwarded a request for bandwidth message to the first broker or has not forwarded a release bandwidth message, or has acted in such a way at a rate above a particular threshold, then the first broker may be adapted to not forward a new request message to the second broker, but to forward a new release bandwidth message to the second broker.

Additionally or alternatively, for example, an associated broker (e.g. 880) which receives a forwarded release bandwidth management message from another broker may be adapted to add the released bandwidth to the pool in order to grant bandwidth to controlling meter agent(s) controller(s) with respect to associated meter(s) in the distributed meter. In another example, the broker may determine whether or not the released bandwidth is needed (e.g. depending on whether or not the pool is above a threshold) and if not needed then the broker may be adapted to forward the message to yet another broker (e.g. same, randomly selected, or selected based on past interactions), or may be adapted to return the bandwidth management message to the sending broker, so that the sending broker may then transmit the message to another broker. An associated broker may possibly keep track of forwarded release and request messages from other broker(s), and/or the frequency of receiving forwarded release messages and/or forwarded request messages from various broker(s), if destination(s) of forwarding future message(s) are to be selected based on previous interactions.

In cases where there may be a centralized broker (e.g. 880), bandwidth request and bandwidth release messages may be transmitted to the centralized broker. The centralized broker may be adapted to grant (e.g. in positive grant bandwidth management messages) a pool of bandwidth, for instance, to meter agent(s) controller(s) that sent bandwidth request message(s). Additionally or alternatively, the broker may be adapted to distribute negative grant bandwidth messages to meter agent(s) controller(s), for example if there are too many requests for bandwidth with respect to meter(s) in the distributed meter.

The reallocation (also referred to herein as granting) algorithm for a centralized broker or a dispersed broker associated with two or more meters may vary depending on the embodiment. The reallocation algorithm may include, for instance, reallocation of bandwidth released from meter(s), if any. For example, the reallocation may be random where a positive pool of bandwidth (e.g. above zero bandwidth) may be sent to a meter agent(s) controller with respect to a random meter (or a random associated meter) in the distributed meter. In such an example, if the meter does not need the bandwidth, the bandwidth will eventually be returned to the broker (e.g. in a release bandwidth message). As another example, the reallocation algorithm for a positive pool of bandwidth may be weighted, e.g. in accordance with the severity grades. In such an example, the broker may prefer to positively grant bandwidth to meters, regarding which meter agent(s) controller(s) have sent bandwidth requests, over meters, regarding which meter agent(s) controller(s) have not sent bandwidth requests. In such an example, meters, regarding which meter agent(s) controller(s) sent bandwidth release messages, may not be granted positive bandwidth.

Additionally or alternatively, in some cases with dispersed brokers or a centralized broker, a broker may be adapted to keep extra bandwidth that is not needed by meters of the distributed meter, for later use of the distributed meter, or may be adapted to share the extra bandwidth with one or more other distributed meters, e.g. if no bandwidth request message(s) are being received for a certain duration. Therefore, not all released bandwidth may necessarily be reallocated within the distributed meter. For instance, only a portion of released bandwidth may be reallocated within the distributed meter. Similarly, the distributed meter may be reallocated extra bandwidth that was shared from one or more other distributed meters. In such cases, a total allocated bandwidth for the distributed meter may potentially reach the sum of bandwidths previously allocated to the distributed meter and to the one or more other distributed meters, e.g. up to the total bandwidth allowed for the network.

Figure 13:
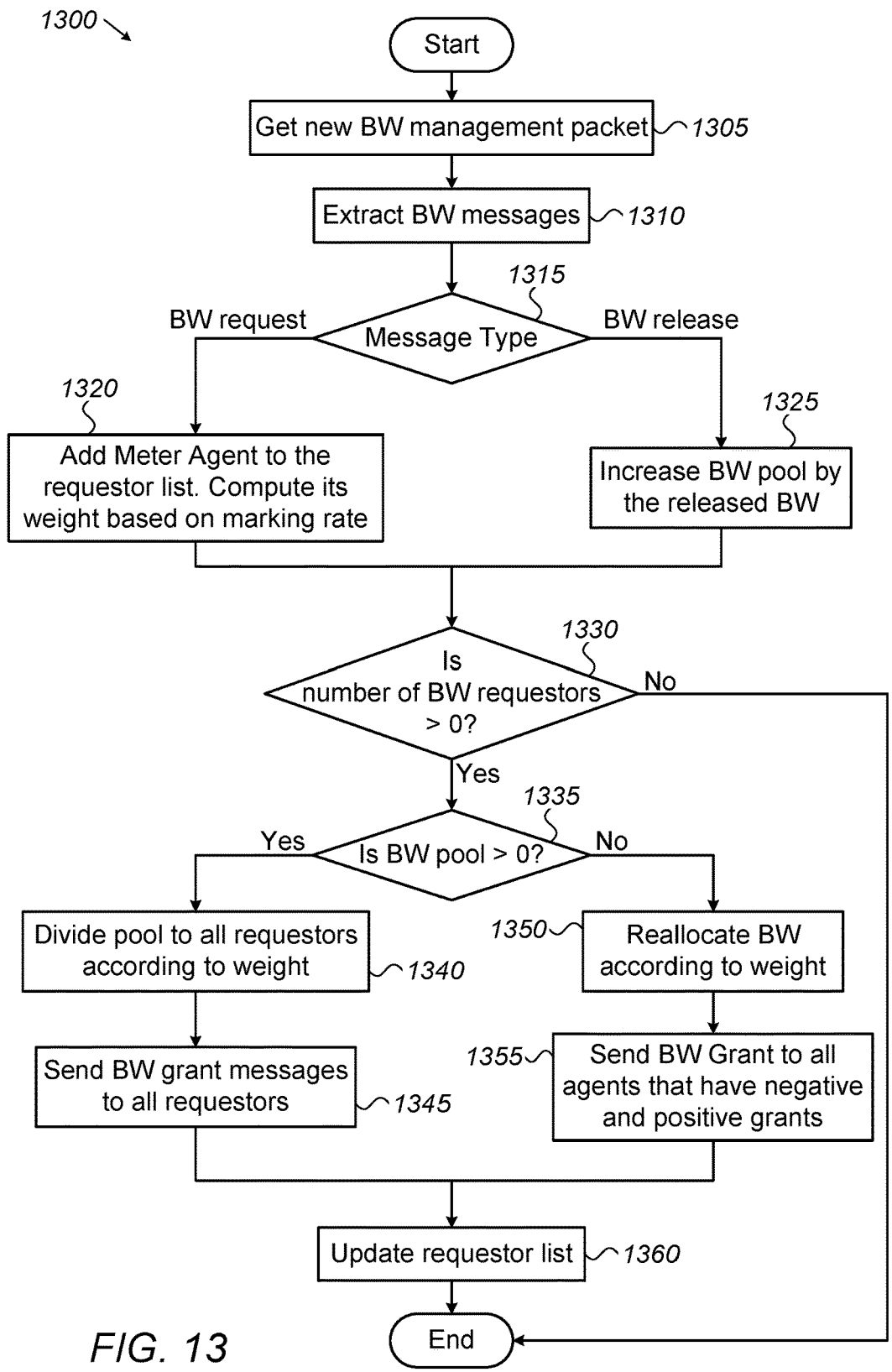
FIG. 13 is a flowchart of a method of processing received bandwidth management messages by a bandwidth broker, in accordance with some embodiments of the presently disclosed subject matter.

FIG. 13 is a flowchart of a method 1300 of processing received bandwidth management messages by a bandwidth broker such as bandwidth broker 880, in accordance with some embodiments of the presently disclosed subject matter. It is assumed that the bandwidth broker does not share extra bandwidth with any other distributed meter.

Method 1300 may be performed by a centralized broker adapted to receive messages from meter agent(s) controller(s) with respect a plurality of meters that share a total allocated bandwidth of a distributed meter. Additionally or alternatively method 1300 may be performed by a dispersed broker, associated with two or more of the plurality of meters sharing a total allocated bandwidth of a distributed meter, the dispersed broker being adapted to receive messages from the meter agent(s) controller(s) controlling the two or more meters, and to receive forwarded messages from other broker(s). In the description of method 1300, it may be assumed that such a dispersed broker may be adapted to send grant messages to the controlling meter agent(s) controller(s) for the associated meter(s).

In stage 1305, a new bandwidth management packet may be received by the bandwidth broker. The packet may be received from a meter agent(s) controller, in the case of the broker being a centralized or dispersed broker. Additionally or alternatively, if the broker is a dispersed broker, the packet may be received from another dispersed broker, and may include forwarded message(s) from meter agent(s) controller(s) associated with the other broker. In stage 1310, the bandwidth management messages in the packet may be extracted by the bandwidth broker. In some other embodiments, the message(s) may not be encapsulated in a packet, and/or one message may be received at a time.

In stage 1315, for each received message, the bandwidth broker may determine the type of bandwidth message. If the message is a bandwidth request message from a meter agent(s) controller, then in stage 1320, the meter to which the message pertains may be added to the requestor list for the distributed meter that includes the meter. Optionally a weight for the meter is computed based on the severity of the shortage, e.g. as reflected in a severity grade included in the bandwidth request message, where a higher weight may be assigned for a higher severity grade. If the message is instead a bandwidth release message from a meter agent(s) controller (or from another broker, in the case of a dispersed broker), then in stage 1325 the bandwidth pool for the distributed meter that includes the meter to which the release pertains may be increased by the released bandwidth, for instance as adjusted for network latency.

Stages 1315, 1320, and 1325 may be repeated, if a plurality of messages were received in stage 1305, for all received messages.

In stage 1330, the bandwidth broker may determine if the number of bandwidth requesting meters, e.g. that is/are in the list, for a given distributed meter is greater than zero. If no, then method 1300 ends. Optionally, in the case of a dispersed broker, if the number of requesting meters is zero, and the pool is above a threshold, a release message from a meter agent(s) controller or from a sending broker, is forwarded to another broker or returned to the sending broker.

If the number of requesting meters (also referred to herein as "requestors") for a given distributed meter is greater than zero, then in stage 1335, it may be determined if the bandwidth pool for the given distributed meter is greater than zero.

If the bandwidth pool for the given distributed meter is greater than zero, then bandwidth reallocating in stage 1340 may include dividing the pool between all meters (or in the case of dispersed, all associated meters) included in the distributed meter that requested allocation of additional bandwidth. For example, the division may be based on weights assigned to the meters, e.g. where the weights may be dependent on the severity of the shortage for the various meters. Alternatively, for example, the division in stage 1340 may be equal among all the requesting meters. Alternatively, for example, in the bandwidth reallocating of stage 1340 the entire pool may be allocated to the first requesting meter (or to the first few requestors, or to less than all of the requestors) in the requestor list. In the latter two examples, the convergence to optimal allocated bandwidths (or in other words to allocated bandwidths closely matching data bandwidths) for the various requesting meters may be slower than if the division were made by weight. Weights may not be used, for example, if the severity of the bandwidth shortage is not indicated in the request messages (e.g. the messages excluded severity grades). In stage 1345, bandwidth grant message(s) may be generated and sent. For example, in the case of a centralized broker or a dispersed broker, bandwidth grant message(s) may be generated and sent with respect to requestor(s) (e.g. requesting meter(s) or requesting associated meter(s)) whose allocated bandwidth has changed (e.g. increased) due to the reallocation. As another example, bandwidth grant message(s) may be generated and sent with respect to all requestor(s) regardless of whether or not allocated bandwidth has changed for the requestor. In such an example, a bandwidth grant message for a requestor whose allocated bandwidth has not changed, may be indicative that the allocated bandwidth remains the same.

If instead, the bandwidth pool is determined to be less than zero in stage 1335, then in stage 1350, the bandwidth may be reallocated by negative and positive granting of bandwidth. For example, for a centralized broker, the bandwidth of the distributed meter may be reallocated among all meters of the distributed meter. For a dispersed broker, the part of the bandwidth of the distributed meter that is currently allocated to the meters associated with the dispersed broker may be reallocated among the meters. Bandwidth may be reallocated based on weights, or may be reallocated equally among meters to which the bandwidth is being reallocated. For example, a weight for a particular meter may be dependent on whether or not the meter requested an allocation of additional bandwidth or not, where a higher weight may be assigned to a meter that requested an allocation of additional bandwidth than to a meter that did not request an allocation of additional bandwidth. Additionally or alternatively, the weight assigned to a meter that requested an allocation of additional bandwidth may be dependent on the severity of shortage, e.g., as reflected in a severity grade included in the bandwidth request message. Optionally in the case of a dispersed broker, request message(s) received from meter agent(s) controller(s) may be forwarded to other broker(s) in order to indicate the need for additional bandwidth at the broker. In stage 1355, grant bandwidth message(s) may be generated and sent by the broker. For example, a grant bandwidth message may be generated and sent to a meter agent(s) controller with respect to a meter regardless of whether or not the allocated bandwidth for the meter has changed (e.g. increased or decreased) due to the reallocation. In such an example, a bandwidth grant message for a meter whose allocated bandwidth has not changed, may be indicative that the allocated bandwidth remains the same. As another example, grant bandwidth message(s) may only be generated and sent with respect to meter(s) whose allocated bandwidth has changed (e.g. increased or decreased) due to the reallocation.

In stage 1360, following either stage 1355 or stage 1345, the requestor list may be updated. For example, all requesting meter(s) that were granted bandwidth (positive and/or negative) may be removed from the requestor list. Method 1300 then ends.

Additionally or alternatively to performing stages 1330 to 1360 when a packet is received, stages 1330 to 1360 may be performed independently of stages 1305 to 1325 of method 1300.

From the above description it should be understood that a system in accordance with some embodiments of the presently disclosed subject matter may include at least part of a meter agent(s) controller. The at least part, for example may control at least one meter. Additionally or alternatively, a system in accordance with the presently disclosed subject matter may include a bandwidth broker, for example associated with at least one meter that is included in at least one distributed meter. Additionally or alternatively, a system in accordance with the presently disclosed subject matter may include at least part of a distributed meter, the at least part of the distributed meter including at least one meter and/or at least one bandwidth broker. Additionally or alternatively, a system in accordance with the presently disclosed subject matter may include at least part of a node having at least one meter agent(s) controller and/or at least one bandwidth broker. Additionally or alternatively, a system in accordance with the presently disclosed subject matter may include a node having at least one meter agent(s) controller and/or at least one bandwidth broker. Additionally or alternatively, a system in accordance with the presently disclosed subject matter may include node(s) with virtual machine(s), node(s) with storage block(s), etc. Additionally or alternatively a system in accordance with the presently disclosed subject matter may include a plurality of any of: meter agent(s) controllers, bandwidth brokers, distributed meters, and/or nodes.

Any of the modules in a system in accordance with the presently disclosed subject matter may include appropriate hardware, software, and/or firmware capable of performing the function(s) (e.g. described above) of the module. The hardware, software and/or firmware may vary depending on the embodiment, but for the sake of further illustration some examples are now provided.

Hardware may include, in some embodiments, any appropriate memory, for instance volatile, non-volatile, erasable, non-erasable, removable, non-removable, writeable, re-writeable memory, for short term storing, for long term storing, etc., such as registers, SRAM, DRAM, flash memory, embedded DRAM, etc. Hardware may additionally or alternatively include, comparators; adders; combinatory logic such as multiplexers, OR gates, AND gates, XOR gates; multiplier(s), shift register(s), physical port(s), etc. Hardware may additionally or alternatively include circuits, comprising for instance any electronic components (e.g. resistors, inductors, capacitors, diodes, transistors, other switching components, etc.) connected by connections such as wires, conductive traces, vias etc. Hardware may additionally or alternatively include processor(s) and/or state machine(s). The term "processor" as used herein may refer to a processor of any suitable type operative to execute instructions, such as a load store processor, a processing pipe, a programmable very long instruction word (VLIW) engine, etc. Hardware may additionally or alternatively include one or more integrated circuits, printed circuit boards (also referred to herein as printed circuit board assemblies), or the like that may comprise hardware (e.g. hardware described in the current paragraph) that is suitable for inclusion in the integrated circuit(s), printed circuit board(s) or the like.

For instance, in some examples of meter agent(s) controller 240 or 740, memory 210, packet marking/dropping 230, bandwidth deposit 250 or 850, bandwidth consumption 240 or 840, and bandwidth sensor 855 may include hardware, software and/or firmware. For example, software and/or firmware may be more likely to be included if a meter agent(s) controller is in an endpoint node where the data bandwidth may be expected to be lower than if the meter agent(s) controller is in an intermediary node where the data bandwidth may be expected to be higher. Hardware of bandwidth deposit 250 or 850, for example, may include a state machine. Hardware of bandwidth consumption 240 or 840, for example, may include comparator(s) and/or adder(s) (e.g. functioning to subtract). For a statistical bandwidth consumption 240 or 840, hardware may additionally or alternatively include a random number generator (e.g. comprising logic gates and/or flip flops). Hardware of bandwidth sensor 855, for example, may include adders, comparators, multiplexers, and/or memory. Bandwidth restrainer 865 may include hardware, firmware and/or software. Hardware of bandwidth restrainer 865, for example, may include comparator(s), memory, and/or adder(s). Bandwidth message parser 860 may include software, firmware and/or hardware. Hardware of message parser 860, for example may include multiplexers. Bandwidth message generator 870 may include hardware, firmware and/or software such as memory, comparators, etc. In some embodiments, the makeup of modules of meter agent(s) controller 240 or 740 may be different than listed in this paragraph and may include any appropriate hardware, software and/or firmware.

For instance, a centralized bandwidth broker (e.g. bandwidth broker 880) may comprise software, firmware and/or hardware. The hardware of a centralized broker may include, for example, processor(s) located at an endpoint node (e.g. in a physical server or a router with an IP address) in a network. A dispersed broker (e.g. bandwidth broker 880) may comprise hardware, firmware and/or software. In some embodiments, dispersed bandwidth brokers may be located at a plurality of nodes. The plurality of nodes may include endpoint nodes and/or intermediary nodes in the network. For example, the hardware of a dispersed broker at an endpoint node may include processor(s) of a physical server, of a router with an IP address, etc. The hardware of a dispersed broker at an intermediary node may include, for example, processor(s) and/or other hardware. The other hardware may include, for instance, memory, multiplexers, adders, and/or comparators. The term intermediary nodes refers to nodes that are not endpoint nodes. A bandwidth broker (centralized or dispersed) that includes processor(s) may be adapted to perform more sophisticated tasks such as learning the network, keeping statistics regarding bandwidth management messages, etc., which a bandwidth broker that includes only other hardware may not necessarily be adapted to perform. Referring to modules of bandwidth broker 880, bandwidth message parser 885 may include software, firmware and/or hardware. Bandwidth message generator 895 may include software, firmware and/or hardware. Bandwidth reallocation 890 may include software, firmware and/or hardware. For example, in some cases, the hardware of bandwidth message parser 885, bandwidth reallocation 890, and/or bandwidth message generator 895 may include processor(s). In some embodiments, the makeup of a bandwidth broker may be different than listed in this paragraph, and may include any appropriate hardware, software and/or firmware.

For instance, input interface(s) and output interface(s) of any node, e.g. a node including meter agent(s) controller(s) and/or bandwidth broker(s) (e.g. switch 100, 700 or any other node) may include, for instance, physical and/or virtual (logical) port(s). Packet header processing in such a node (e.g. packet header processing 120) may include, for instance, packet processor(s) such as a programmable very long instruction word (VLIW) engine. Queueing and scheduling, in such a node (e.g. queuing and scheduling 150) may include, for instance, memory and adder(s). A packet buffer at such a node (e.g. packet buffer 130) may include, for instance, memory. Packet header editing at such a node (e.g. packet header editing 160) may include, for instance, packet processor(s) such as a programmable VLIW engine. In some embodiments, not all nodes may necessarily include all of the above components mentioned in this paragraph.

In other embodiments, the system and modules thereof may include additional, less and/or different structure than listed above. Additionally or alternatively, when referring to the inclusion of processor(s) in a system module, the processor(s) may be exclusive to the module, or the module may be implemented on processor(s) which performs at least one other function of the system.

When software is comprised in the system in accordance with some embodiments of the presently disclosed subject matter, the software may be executed by one or more processors e.g. in the system. The term computer, as used herein should be understood to refer to any item that includes one or more processors. Software may include instructions, which, if executed by the computer (e.g. the processor(s) in the system) may cause performance of one or more operations. For example, the performed operation(s) may include any operation(s) described herein, e.g. with reference to FIGS. 3, 9, 10, 11, and/or 13. The instructions may include any suitable type of instructions, such as source code, compiled code, interpreted code, executable code, static code, dynamic code, VLIW instructions, and the like. The instructions may be implemented according to a pre-defined computer language, manner or syntax, for instructing a processor to perform a certain function. The instructions may be implemented using any suitable high-level, low-level, object-oriented, visual, compiled or interpreted programming language, such as C, C++, Java, BASIC, Matlab, Pascal, Visual BASIC, assembly language, machine code, and the like. Instructions may include, for example, data, words, values, symbols, and the like.

It will be appreciated that in some embodiments, switch 100, meter agent(s) controller 140, switch 700, meter agent(s) controller 740, or broker 880 may include fewer or more and/or different module(s) than shown in FIG. 1, FIG. 2, FIG. 7, FIG. 8, or FIG. 8, respectively. Additionally or alternatively, switch 100, meter agent(s) controller 140, switch 700, meter agent(s) controller 740, or broker 880 may include different module(s) than shown in FIG. 1, FIG. 2, FIG. 7, FIG. 8, or FIG. 8, respectively. For example, although bandwidth deposit 250 is shown separate from statistical bandwidth consumption 240 in FIG. 2, in some embodiments bandwidth deposit 250 may be integrated with statistical bandwidth consumption 240 in an integrated module, so that the functionality of both statistical bandwidth consumption 240 and bandwidth deposit 250 may be performed by the integrated module. Similarly, for example, although bandwidth deposit 850 is shown separate from deterministic/statistical bandwidth consumption 840 in FIG. 8, in some embodiments bandwidth deposit 850 may be integrated with deterministic/statistical bandwidth consumption 840 in an integrated module, so that the functionality of both deterministic/statistical bandwidth consumption 840 and bandwidth deposit 850 may be performed by the integrated module.

Additionally or alternatively, switch 100, meter agent(s) controller 140, switch 700, meter agent(s) controller 740, or broker 880 may include more or less functionality than described herein. Additionally or alternatively, switch 100, meter agent(s) controller 140, switch 700, meter agent(s) controller 740, or broker 880 may include different functionality than described herein. Additionally or alternatively, function(s) attributed herein to a particular module of switch 100, meter agent(s) controller 140, switch 700, meter agent(s) controller 740, or broker 880 may in some embodiments be additionally or alternatively performed elsewhere in switch 100, meter agent(s) controller 140, switch 700, meter agent(s) controller 740, or broker 880 respectively. It should also be should will be appreciated that switch 100, meter agent(s) controller 140, switch 700, meter agent(s) controller 740 and broker 880 are only examples of nodes, meter agent(s) controllers and brokers, and that in some other embodiments any of the modules included and/or the functions performed by nodes, meter agent(s) controllers and brokers may vary from those described for switch 100, meter agent(s) controller 140, switch 700, meter agent(s) controller 740 and broker 880 and are therefore not bound by the described modules and functions.

It will be further appreciated that method(s) relating to statistical and/or distributed meters may vary depending on the embodiment, and are therefore not bound by methods 300, 900, 1000, 1100, and 1300 described above. For example, in some embodiments, any of methods 300, 900, 1000, 1100, and 1300 may include additional stages or fewer stages than illustrated in FIGS. 3, 9, 10, 11, and 13 respectively. Additionally or alternatively, any of methods 300, 900, 1000, 1100, and 1300 may include different stages than illustrated in FIGS. 3, 9, 10, 11, and 13 respectively. Additionally or alternatively, stages which are illustrated as being performed sequentially, may in some embodiments be performed in parallel. Additionally or alternatively, stages which are shown in a certain order, may in some embodiments be performed in a different order. Various examples of data units such as bits and bytes are referred to herein, but depending on the embodiment, the data unit(s) actually used may vary.

It will be further appreciated that the subject matter contemplates, for example, a computer program product comprising a computer readable medium having computer readable program code embodied therein for executing one or more method(s) or part(s) of method(s) disclosed herein. Further contemplated, for example are computer readable program code for executing method(s) or part(s) of method(s) disclosed herein and a computer readable medium having computer readable program code embodied therein for executing method(s) or part(s) of method(s) disclosed herein. A computer readable medium embodying program code may be any suitable medium for storing the program code or may be any suitable medium for transferring the program code from one computer to another computer. The phrase "non-transitory computer-readable medium" may be directed to include any suitable computer-readable medium, with the sole exception being a transitory propagating signal.

In the above description of example embodiments, numerous specific details were set forth in order to provide a thorough understanding of the subject matter. However, it will be understood by those skilled in the art that some examples of the subject matter may be practiced without these specific details. In other instances, well-known features have not been described in detail so as not to obscure the subject matter.

Usage of the terms "normally", "typically although not necessarily", "typically", "conventionally", "although not necessarily so", "such as", "e.g.", "possibly", "perhaps", "it may be possible", "optionally", "say", "one embodiment", "embodiments", "an embodiment", "some embodiments", "certain embodiments", "example embodiments", "various embodiments", "other embodiments", "some other embodiments", "another embodiment", "for example" "one example", "an example" "some examples", "examples", "another example", "various examples", "other examples", "for instance", "an instance", "one instance", "some instances", "another instance", "other instances", "various instances" "one case", "cases", "some cases", "another case", "other cases", "various cases", or variants thereof should be construed as meaning that a particular described feature is included in at least one non-limiting embodiment of the subject matter, but not necessarily in all embodiments. The appearance of the same term does not necessarily refer to the same embodiment(s).

Usage of conditional language, such as "may", "can", "could", or variants thereof should be construed as conveying that one or more embodiments of the subject matter may include, while one or more other embodiments of the subject matter may not necessarily include, a particular described feature. Thus such conditional language is not generally intended to imply that a particular described feature is necessarily included in all embodiments of the subject matter. Non-usage of conditional language does not necessarily imply that a particular described feature is necessarily included in all embodiments of the subject matter.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination. It will be appreciated by persons skilled in the art that the present disclosure is not limited by what has been particularly shown and described hereinabove. Rather the scope of the disclosure is defined by the appended claims and equivalents thereof.

What is claimed is:

1. A network node in a packet communication network, the network node comprising:
 a memory, including one or more memory entries associated with a meter, wherein the one or more memory entries include one or more values and the meter performs statistical updates of the one or more memory entries, at least one statistical update to decrease at least one of the one or more values for a plurality of packets classified to the meter, at a time;
 a sensor adapted to detect a discrepancy between an allocated bandwidth allocated to the meter and a data bandwidth measured by the meter, wherein the data bandwidth measured by the meter is associated with the time of the at least one of the statistical update, and wherein being adapted to detect the discrepancy includes being adapted to detect in accordance with at least one criterion at least one of: that the discrepancy is that the allocated bandwidth compared to the data bandwidth is excessive, or that the discrepancy is that the allocated bandwidth compared to the data bandwidth is insufficient, and wherein the allocated bandwidth is a portion of a total allocated bandwidth allocated to a plurality of meters; and
 a generator, wherein the generator is adapted, upon the sensor detecting the discrepancy of the allocated bandwidth being excessive, to generate a message indicative of at least part of the allocated bandwidth being released from the meter, thereby enabling the at least part of the allocated bandwidth, or a portion thereof, to be reallocated to one or more of the plurality of meters, and
 wherein the generator is adapted, upon the sensor detecting the discrepancy of the allocated bandwidth being insufficient, to generate a message indicative of a request for an allocation of additional bandwidth to the meter, and
 upon the sensor detecting the discrepancy of the allocated bandwidth being excessive, the at least part of the allocated bandwidth is released from the meter.

2. The network node of claim 1, wherein the plurality of meters includes meters associated with a single measured entity.

3. The network node of claim 1, wherein at least part of the plurality of meters are located on paths that do not include the node.

4. The network node of claim 1, wherein the network node is a switch.

5. The network node of claim 1, the network node further comprising a depositor and a consumer, wherein the depositor is adapted to increase at least one of the one or more values by tokens of data units in accordance with a token rate, and wherein the consumer is adapted to decrease the at least one of the one or more values for data units of packets classified to the meter that are not marked as high drop precedence.

6. The network node of claim 5, wherein the depositor is further adapted to decrease a quantity of data units per token, if the at least part of the bandwidth is being released, or to increase the quantity of data units per token if the additional bandwidth is allocated to the meter.

7. The network node of claim 5, wherein the consumer being adapted to decrease, includes the consumer being adapted to decrease for the plurality of packets classified to the meter, at the time.

8. The network node of claim 1, further comprising an output interface adapted to send the generated message.

9. A method comprising;
 detecting a discrepancy between an allocated bandwidth, allocated to a meter that is included in a network node of a packet communication network, and a data bandwidth measured by the meter, wherein the data bandwidth measured by the meter is associated with a time of a statistical update of at least one value of one or more memory entries of a memory of the network node for a plurality of packets classified to the meter, the allocated bandwidth being a portion of a total allocated bandwidth allocated to a plurality of meters, and the discrepancy being that the allocated bandwidth compared to the data bandwidth is one of: excessive or insufficient, in accordance with at least one criterion; and upon detecting the discrepancy:
 generating a message indicative of at least part of the allocated bandwidth being released from the meter, thereby enabling the at least part of the allocated bandwidth, or a portion thereof, to be reallocated to one or more of the plurality of meters, and releasing the at least part of the allocated bandwidth, if the discrepancy is indicative of the allocated bandwidth being excessive; or
 generating a message indicative of a request for an avocation of additional bandwidth to the meter, if the discrepancy is indicative of the allocated bandwidth being insufficient.

10. The method of claim 9, further comprising determining a severity grade for the meter, wherein said at least one criterion includes the severity grade being above a threshold and wherein the detecting includes detecting, based at least partly on the severity grade being above the threshold, that the allocated bandwidth is insufficient.

11. The method of claim 9, wherein said at least one criterion includes an accumulated surplus of past allocated bandwidth over past data bandwidth being above a threshold and wherein the detecting includes, detecting based at least partly on the accumulated surplus of past allocated bandwidth over past data bandwidth being above the threshold, that the allocated bandwidth is excessive.

12. The method of claim 11, wherein said releasing the at least part of the allocated bandwidth, includes at least one of: reducing an accumulated surplus of past allocated bandwidth over past data bandwidth, or causing a subsequent allocated bandwidth to be less than the allocated bandwidth.

13. The method of claim 11, further comprising parsing a received message indicative of an updated allocated bandwidth; and implementing the updated allocated bandwidth in response to the received message, the implementing including at least one of: updating an accumulated surplus of past allocated bandwidth over past data bandwidth, or substituting the updated allocated bandwidth or another allocated bandwidth which is a function of the updated allocated bandwidth and a change in the accumulated surplus due to the updating.

14. The method of claim 13, wherein said implementing the updated allocated bandwidth includes taking into account network latency.

15. The method of claim 9, further comprising determining whether or not the allocated bandwidth is equivalent to a nominal bandwidth allocated to the meter; and adjusting the allocated bandwidth toward the nominal bandwidth, upon determining that the allocated bandwidth is not equivalent to the nominal bandwidth.

16. A network node in a packet communication network, the network node comprising:
a parser adapted to parse at least one first message that was received, each of the at least one first message indicative of at least one of: a release of at least part of an allocated bandwidth allocated to a particular statistical meter, or a request that additional bandwidth be allocated to the particular statistical meter, the particular statistical meter being one of a plurality of meters, and wherein the particular statistical meter measures data bandwidth to perform at least one statistical update of at least one of one or more values for a plurality of packets classified to the particular statistical meter, at a time;
a reallocator adapted to reallocate at least a portion of a total allocated bandwidth, allocated to the plurality of meters, to at least a subset of the plurality of meters; and
a generator adapted to generate at least one second message for at least a subset of the plurality of meters including the particular statistical meter, each of the at least one second message being indicative of a respective updated allocated bandwidth for a respective meter of the at least a subset of the plurality of meters.

17. The network node of claim 16, wherein the at least one first message comprises at least one message that includes at least one severity grade, and wherein the reallocator is adapted to reallocate the at least a portion of the total allocated bandwidth, at least partly based on the at least one severity grade.

18. The network node of claim 16, further comprising: an output interface, wherein the output interface is adapted to forward via the network one or more packets that encapsulate one or more of the at least one first message, to another parser located at another network node.

19. The network node of claim 16, wherein the generator is further adapted to encapsulate one or more of the at least one second message in one or more packets, the network node further comprising an output interface to send the one or more packets via the network to one or more other network nodes that include one or more meters of the at least a subset of the plurality of meters, the one or more meters having respective updated allocated bandwidth indicated by the encapsulated messages.

20. The network node of claim 16, wherein at least one of: the parser, the reallocator, or the generator includes at least one processor.

21. A method comprising:
parsing at least one first message that was received, each of the at least one first message indicative of at least one of: a release of at least part of an allocated bandwidth allocated to a particular statistical meter or a request that additional bandwidth be allocated to the particular statistical meter, the particular statistical meter being one of a plurality of meters, and wherein the particular statistical meter measures data bandwidth to perform at least one statistical update of at least one of one or more values for a plurality of packets classified to the particular statistical meter, at a time;
reallocating at least a portion of a total allocated bandwidth,
allocated to the plurality of meters, to at least a subset of the plurality of meters; and
generating at least one second message for the at least a subset of the plurality of meters including the particular statistical meter, each of the at least one second message being indicative of a respective updated allocated bandwidth for a respective meter of the at least a subset of the plurality of meters.

22. The network node of claim 1, wherein the sensor includes at least one of: adder, comparator, multiplexer, or memory.

23. The network node of claim 1, wherein the generator includes at least one of: comparator or memory.

* * * * *